United States Patent [19]
Fukawa et al.

[11] Patent Number: 5,757,845
[45] Date of Patent: May 26, 1998

[54] ADAPTIVE SPREAD SPECTRUM RECEIVER

[75] Inventors: Kazuhiko Fukawa, Yokohama; Hiroshi Suzuki, Yokosuka, both of Japan

[73] Assignee: NTT Mobile Communications Network, Tokyo, Japan

[21] Appl. No.: 446,717

[22] PCT Filed: Feb. 9, 1995

[86] PCT No.: PCT/JP95/00179

§ 371 Date: May 30, 1995

§ 102(e) Date: May 30, 1995

[87] PCT Pub. No.: WO95/22214

PCT Pub. Date: Jul. 17, 1995

[30] Foreign Application Priority Data

Feb. 10, 1994 [JP] Japan .................. 6-016836

[51] Int. Cl.$^6$ .................. H04B 15/00; H04K 1/00; H04L 27/30

[52] U.S. Cl. .................. 375/200; 375/206; 375/207; 370/342

[58] Field of Search .................. 375/200, 206, 375/207, 209, 210; 370/342

[56] References Cited

U.S. PATENT DOCUMENTS

| | | | |
|---|---|---|---|
| 4,550,414 | 10/1985 | Guinon et al. | 375/1 |
| 5,293,398 | 3/1994 | Hamao et al. | 375/1 |
| 5,359,624 | 10/1994 | Lee et al. | 375/1 |
| 5,414,699 | 5/1995 | Lee | 370/18 |
| 5,511,068 | 4/1996 | Sato | 370/18 |
| 5,583,884 | 12/1996 | Maruyama et al. | 375/207 |
| 5,590,160 | 12/1996 | Ostman | 375/367 |
| 5,592,506 | 1/1997 | Omura et al. | 375/207 |
| 5,594,754 | 1/1997 | Dohi et al. | 375/200 |

Primary Examiner—Stephen Chin
Assistant Examiner—Mohammad Ghayour
Attorney, Agent, or Firm—Pollock, Vande Sande & Priddy

[57] ABSTRACT

Sampled signals SPS of a spread-spectrum received signal are fed to matched filters $12_1$ to $12_4$, wherein they are despread. A spreading code of a desired signal is used as a despreading code in the matched filter $12_1$, and a plurality of spreading codes which are orthogonal to the spreading code of the desired signal and orthogonal to one another are used for despreading in the matched filters $12_2$ to $12_4$. Outputs $x_1$ to $x_4$ from the filters $12_1$ to $12_4$ are multipled by weighting coefficients $w_1$ to $w_4$; the multiplied outputs are linearly combined into a combined signal DCS. A coefficient control part 37 is supplied with the signals $x_1$ to $X_4$ to be multiplied by the weighting coefficients $w_1$ to $w_4$ and the combined signal DCS and determines the weighting coefficients $w_1$ to $w_4$ by an algorithm that minimizes the average power of the combined signal DCS under a constraint on the weighting coefficients $w_1$ to $w_4$.

24 Claims, 24 Drawing Sheets

ADAPTIVE SPREAD SPECTRUM RECEIVER

TECHNICAL FIELD

The present invention relates to a receiver for use in a direct sequence code division multiple access in spread spectrum communications, designed to adaptively remove interference signals.

With a view to implementing efficient utilization of frequency, a variety of spread spectrum systems have been studied in recent years (M. K. Simon, J. K. Omura, R. A. Scholtz and B. K. Levitt, "Spread Spectrum Communication," Computer Science Press, 1985). A CDMA (Code Division Multiple Access) system using a DS (Direct Sequence) scheme, in particular, is now being studied for practical use because of its relatively simple configuration.

With a conventional DS-CDMA receiver, a received wave from an antenna is amplified by an amplifier and is then input into a quasi-coherent detector circuit. The quasi-coherent detector circuit quadrature-detects the received signal, using, as a reference signal, a local carrier signal which is not synchronized with the received signal in phase but synchronized therewith in frequency, and outputs the amplitudes I(t) and Q(t) of in-phase and quadrature components of the received signal. The components I(t) and Q(t) will hereinafter be generically referred to as a received signal. The received signal will normally be identified with I(t) as the real part and jQ(t) as an imaginary part (j being an imaginary unit); therefore, various operation involved are complex ones. In the DS system, the received signal is subjected to despread-processing to extract therefrom a despread signal of a desired signal. Two methods are available for this despread-processing. One is a method that employs a matched filter with a spreading code; the output signal of the filter is used as the despread signal. The other method is one that multiplies the received signal by a spreading code in synchronization with the timing of the former and then extracts a DC component of the received signal by means of a low-pass filter; the DC component is used as the despread signal. While the method using the matched filter will hereinbelow be described, the same results as those obtainable therewith could also be produced by the other methods as well. The despread signal is demodulated in the baseband domain, by which a transmitted symbol sequence is extracted.

In such a DS-CDMA system, a plurality of users simultaneously utilize the same carrier frequency. The users use different spreading codes, but the spreading codes have some cross-correlation. Therefore, even if each user despreads the received signal by the spreading code of the particular desired signal, components of other users' signals get mixed into the despread signal. Thus, when the number of other users is large, the level of interfering signal components that get mixed into the despread signal of each user increases, causing significant degradation of the transmission performance. This degradation becomes increasingly serious when the received signal levels of other users exceed the received level of the desired signal at each users One possible solution to this problem is to control the power of transmission to each user to keep the level at the receiving point of each user constant, but it is very difficult to perfectly realize this transmission power control. The degradation of the transmission performance due to the cross-correlation between the spreading codes could be avoided by additionally equipping the receiver with an interference cancelling function. Conventional solutions and their defects will hereinbelow be described.

PRIOR ART EXAMPLE 1

In FIG. 1, there is shown a prior art configuration in which received signals by receiving antennas of plural branches are each despread by a spreading code of a desired signal and the resulting despread signals are linearly combined to cancel interference (Winters, J. H., "Spread Spectrum in a Four-Phase Communication Systems Employing Adaptive Antenna," IEEE Trans. on Comm., vol. COM-30, No. 5, pp. 929–936, May 1982). This example employs a four-branch configuration.

Sampled signals, by sampling received signals from respective antennas at regular time intervals, are fed into input terminals $11_1$ to $11_4$. Connected to the input terminals $11_1$ to $11_4$ are matched filters (MF) $12_1$ to $12_4$ of the same construction, respectively. The matched filters $12_1$ to $12_4$ each detect the correlation between the spreading code of the desired signal and the sampled signals fed thereto. The outputs of the matched filters $12_1$ to $12_4$ each contain interfering signal components due to the correlation with spreading codes of the other users, in addition to the desired signal. The outputs of the matched filters $12_1$ to $12_4$ are multiplied by weighting coefficients $w_1$ to $w_4$ in multipliers $13_1$ to $13_4$, respectively, and the outputs of the multipliers are combined together by an adder 15 into a combined signal. The combined signal is fed to a decision circuit 16 for hard decision; the resulting decision signal is outputted at an output terminal 17. A subtractor 18 calculates the difference between the combined signal and the decision signal and outputs it as an estimation error E; a coefficient control part 19 uses the estimation error E and the input signals MS of the multipliers $13_1$ to $13_4$ to control the weighting coefficients $w_1$ to $W_4$ by employing an adaptive algorithm that minimizes the square of the estimation error E. That is, the weighting coefficients are controlled so that the average power of interference signal components and a noise signal contained in the combined output signal of the adder 15 becomes minimum.

This method requires a plurality of antennas for diversity reception, that is, requires a large amount of hardware complexity; hence, the method is hard to employ in mobile radio receivers. Furthermore, the signals received in the respective branches are combined so that they become in-phase with one another when no interfering signals exist, and when interference signals exist, they are combined so that the interference signal components are removed. To perform this, the phases and amplitudes of the weighting coefficients $w_1$ to $W_4$ are adaptively controlled; this control is very difficult to realize in the fast fading environments as in mobile radio communications.

PRIOR ART EXAMPLE 2

In FIG. 2, there is shown the configuration of the prior art that has a diversity effect on a multipath signal received by a single antenna and performs interference cancellation (Abdulrahman, M., D. D. Falconer and A. U. H. Sheikh, "Equalization for Interference Cancellation In Spread Spectrum Multiple Access Systems," Proc. 42nd Vehicular Technology Conference, pp. 71–74, May 1992). In FIG. 2, the multipliers $13_1$ to $13_4$ and the adder 15, which form the combining circuit in FIG. 1, are replaced with a transversal filter 21 that is equivalent to their combination. The received signal outputted by the single antenna is sampled at regular time intervals and fed as a sampled signal SPS to the input terminal 11. The sampled signal SPS is fed to the matched filter 12, which calculates its correlation with the spreading code of a desired signal to obtain the despread signal. The despread signal reflects the impulse response of the multipath channel and contains multipath delayed signal components of different delay times. The despread signal containing the multipath delayed signal components is inputted into the transversal filter 21 and products of respective tap outputs of the transversal filter 21 multiplied by tap coefficients supplied as a tap coefficient vector W to the taps of the transversal filter 21 are added up together thereby obtaining convolution between the despread signal and the tap coefficients. As the result of this, a combined signal free from interference is provided. The decision circuit 16 inputs thereinto the combined signal and makes a signal decision by hard decision and feeds the decision signal to the output terminal 17. The subtractor 18 outputs, as the estimation error E, the difference between the combined signal and the decision signal. The coefficient control part 19 inputs thereinto the estimation error E and an output signal sequence MS of the matched filter 12 which is fed to the transversal filter 21, and controls the tap coefficient W of the transversal filter 21 so that the square of the estimation error E becomes minimum.

In FIG. 2, the matched filter 12 and the transversal filter 21 both perform linear processing; there is also known a method which executes the linear processing by a single transversal filter. In such an instance, however, the tap coefficient vector W needs to be initially converged by a training signal in order to match the characteristics of the transversal filter to the despread signal of a desired signal. To meet this requirement, a switching circuit 22 is changed over from the output terminal 17 side to a terminal 23 to feed the training signal TR as a reference signal to the subtractor 18. After the tap coefficient vector W has converged, the switching circuit 22 is connected to the output terminal 17 side to use the decision signal as the reference signal in the subtractor 18.

With this configuration, it is possible to cancel the interference signals in the multipath delayed components without employing diversity antennas. As is the case with the above-mentioned prior art example, however, when the tracking ability of the adaptive algorithm for the coefficient control is insufficient, no accurate estimation can be made and the performance of the receiver is degraded accordingly.

PRIOR ART EXAMPLE 3

In FIG. 3, there is shown the configuration of a decorrelator that cancels the interference signals due to the spreading signals of other users without employing the adaptive algorithm with a view to overcoming the defect of its tracking ability (Lupas R., and S. Verdu, "Linear multiuser detectors for synchronous Code-Division Multiple-Access Channels," IEEE Trans. Inform Theory., vol. IT-35, No. 1, pp. 123–136, January 1989).

In FIG. 3, the input sampled signal through the input terminal 11 is fed to the matched filters $12_1$ to $12_4$, wherein its correlation with spreading codes of respective users is calculated. The matched filter $12_1$ uses the spreading code of the desired signal and the other matched filters $12_2$ to $12_4$ use spreading codes of other users. The output of the matched filter $12_1$ contains interference signals as well as the desired signal. Since the interference signal can be expressed as a linear combination of output signals of the matched filters $12_2$ to $12_4$, it is possible to completely prevent the interference signal from being contained in the combined signal which is the output of the adder 15, by adjusting or controlling the weighting coefficients $w_1$ to $w_4$ by which the outputs of the matched filters $12_1$ to $12_4$ are multiplied in the multipliers $13_1$ to $13_4$, respectively. This is mathematically equivalent to extracting a component orthogonal to the interference signal as a despread signal of the desired signal. In the decorrelator with such an operation, an inverse matrix calculator 25 calculates an inverse matrix of the correlation matrix of the spreading codes on the basis of information about the spreading codes and reception timing of the users, and outputs particular elements of the inverse matrix as the weighting coefficients $w_1$ to $w_4$.

Since the phase and amplitude of the thus generated combined signal fluctuate with a change of the channel impulse response of the desired signal, it is necessary that a detector for detecting the combined signal fed to an output terminal 26 should track its phase and amplitude fluctuations.

Information about spreading codes and reception timing of all users are requisite for operating the decorrelator. In the DS-CDMA system for mobile radio communications, however, the information about the spreading codes of other users cannot be obtained at the mobile station—this causes a defect that the decorrelator cannot be operated at the mobile station.

PRIOR ART EXAMPLE 4

In FIG. 4, there is shown the configuration of a conventional DS-CDMA adaptive interference canceller which employs the above-mentioned orthogonalization scheme and aims at solving the problem of the decorrelator (Shousei Yoshida, Akihisa Ushirokawa, Shuhzo Yanagi and Yukitsuna Furuya, "DS/CDMA Adaptive Interference Canceller in Mobile Radio Environments, "Technical Report of IEICE, RCS 93–76, November 1993).

As referred to above with reference to FIG. 2, the despreading operation of the matched filter 12 and the linear combination by the transversal filter 21 are both linear operations; the FIG. 4 example performs these operations by only single transversal filter 21. That is, in FIG. 4, the input sampled signal SPS through the input terminal 11 is fed to the transversal filter 21, wherein it is subjected to the despreading and interference cancellation described previously with respect to FIG. 2, and the combined signal CS is outputted by the transversal filter 21. A complex conjugate amplitude normalization circuit 27 normalizes the amplitude of the combined signal delayed by a delay element 28 for a modulation symbol period T and outputs its complex conjugate as a reference signal RS. A multiplier 29 multiplies the combined signal CS by the reference signal RS. The multiplied output is subjected to the hard decision by the decision circuit 16, of which the decision signal is fed to the output terminal 17. In this processing, since the reference signal RS is produced by the delay operation, the multiplied output of the multiplier 29 corresponds to a differentially detected signal. The subtractor 18 outputs the difference between the decision signal at the output terminal 17 and the multiplied output of the multiplier 29 as the estimation error E.

By using the reference signal RS, the sequence MS of the input sampled signal SPS set in the transversal filter 21 and the estimation error E, the coefficient control part 19 controls the tap coefficients W of the transversal filter 21 by an adaptive algorithm so that the square of the estimation error E becomes minimum. The differential detection is not much degraded by a change in the channel impulse response and the estimation error E based on the differentially detected signal is not much degraded either. Therefore, the use of such an estimation error E prevents the accuracy of estimation of the tap coefficients W from being degraded by the adaptive algorithm and suppresses to some extent the degradation of the performance of the receiver by the change in the channel impulse response. Incidentally, in the initial convergence process when the estimation of the tap coefficients have not sufficiently converged, the subtractor 18 makes the estimation of the tap coefficients quickly converge by using the preknown training signal TR of a training signal memory 30 in place of the decision signal with a decision error.

This configuration does not require the information about spreading codes and reception timing of other users, and hence can be applied to the mobile station. Since the adaptive algorithm is operated on the basis of the results of signal decision, the transmission performance will be deteriorated when many errors happen in the signal decision. Hence, (i) under the transmission conditions in which much interference occurs and the signal level is low, a long sequence of training signals is necessary and the transmission efficiency decreases; (ii) when the channel varies so fast that the signal decision error is induced burst-wise, the estimation accuracy of the tap coefficients W decreases and the interference cancelling function is not sufficiently performed.

PRIOR ART EXAMPLE 5

The above-described schemes, except the decorrelator in FIG. 3, controls the coefficients W for multiplication use through use of the adaptive algorithm. The adaptive algorithm that is usually employed is the LMS (Least Mean Square) algorithm which is excellent in characteristic and small in computational complexity, but various other algorithms are known (Haykin, S., "Adaptive Filter Theory," 2nd Ed., Prentice-Hall, 1992). While in the above examples the decision signal is used to compute the estimation error E for controlling the coefficients W, there are also known in other technical fields algorithms which do not require the signal decision, such as a blind algorithm which utilizes the statistical property of signals and an algorithm which places a constraint on the coefficients and controls it so that the average output power becomes minimum. The former requires a long period of time for the convergence while the latter is a known algorithm by Frost which is similar to the LMS algorithm (Frost, O. L., "An algorithm for linearly constrained adaptive array processing," Proc. IEEE, vol. 60, No. 8, pp. 926–935, August 1972). This algorithm is based on the MMSE (Minimum Mean Square Error) standard and is used, for example, in an adaptive array which effects control of directing an array antenna in real time to the direction of arrival of a desired wave to avoid interference waves.

To implement the constrained minimum output power algorithm, however, it is necessary that the composition ratio of the amplitude of the desired wave to be input into each antenna of the adaptive array be preknown and that a steering vector can be obtained from the composition ratio. There is known a power inversion scheme which employs a unit vector in place of the steering vector (Compton R. T., JR., "Adaptive Antennas—Concepts and Performance—," Prentice-Hall, Engllwood Cliffs, 1988). This scheme requires, however, that the antenna element on which the desired wave is mainly incident be preknown and that the condition remain unchanged. There are not known any methods for applying these schemes to the DS-CDMA interference canceller, nor has there been made even such a proposal.

DISCLOSURE OF THE INVENTION

An object of the present invention is to provide an adaptive spread spectrum receiver of the type employing an algorithm that does not require the information about spreading codes and reception timing of other users, the training signal and the result of the signal decision in the interference cancellation by orthogonalization and a diversity receiver which is indispensable to improvement of the channel quality or transmission performance in mobile radio communications.

The adaptive spread spectrum receiver according to the present invention comprises: (1) a sampling circuit which samples a received signal at regular time intervals and outputs sampled signals; (2) a signal extraction part which is supplied with the sampled signals, despreads, linearly combines them and outputs a combined signal; (3) a demodulation part which demodulates the combined signal and outputs a decision signal; and (4) a timing control part which controls the operation timing of each part. In the present invention, the signal extraction part is composed of (5) a despreading/combining part which despreads and linearly combines the input sampled signals through use of weighting coefficients and outputs the combined signal and, at the same time, outputs signals to be multiplied by the weighting coefficients; and (6) a coefficient control part which is supplied with the signal to be multiplied and the combined signal, calculates the weighting coefficients by an algorithm that minimizes the average power of the combined signal under a constraint of the weighting coefficients and outputs the weighting coefficients.

The respective parts of this basic configuration can be developed as described below.

Two kinds of configurations can be applied to the despreading/combining part of the signal extraction part. A first configuration is a cascade connection of a despreading part which despreads the input sampled signals by a plurality of despreading codes into a plurality of despread signals and uses them as signals to be multiplied, and a linearly combining part which generates the combined signal by multiplying the plurality of despread signals by the weighting coefficients. Furthermore, it is also possible to employ, as the despreading codes, a spreading code of a desired signal and one or more spreading codes orthogonal thereto. When two or more spreading codes orthogonal to that of the desired signal are used, it is preferable that they be orthogonal to each other. A second configuration of the despreading/combining part is one that convolutes the input sampled signals and the tap coefficients by a transversal filter to obtain the combined signal and outputs the input sampled signals as the signals to be multiplied.

For diversity reception, (i) the sampling circuit is designed to sample one or more received signals at regular time intervals and output one or more sampled signals, (ii) the signal extraction part is designed as a diversity signal extraction part which performs the despreading and linearly combining operations by the despreading/linearly combining part and outputs a plurality of branch combined signals, and (iii) the demodulating part is designed as a diversity demodulating part which diversity-combines and demodulates the plurality of branch combined signals.

For such diversity reception there are the following antenna diversity configuration and path diversity configuration. (i) In the case of the antenna diversity, the sampling circuit samples a plurality of received signals generated from waves received by a plurality of antennas and outputs a plurality of sampled signals, and the diversity signal extraction part is composed of a plurality of branch signal extraction parts each having the despreading/combining part and the coefficient control part, receives the plurality of sampled signals and outputs a plurality of branch combined signals. (ii) In the case of the path diversity, the sampling circuit samples a single received signal generated from a wave received by a single antenna and outputs a single sampled signal, and the diversity signal extraction part processes the sampled signal in the despreading/combining part and the coefficient control part at a plurality of different timings generated by a timing control part and outputs a plurality of branch combined signals.

In each of the receivers described above, the sampling circuit may also be designed to perform sampling with a sampling timing shorter than the chip timing of the spreading code.

The basic operations of the present invention are such as described below. (1) The sampling circuit samples the received signal at regular time intervals and outputs the sampled signals. (2) The signal extraction part despreads and linearly combines the sampled signals, and outputs the combined signal. (3) The demodulation part demodulates the combined signal and outputs a decision signal. (4) The timing control part controls the operation timing of each part. Furthermore, the despreading/combining part and the factor control part in the signal extraction part perform such operations as mentioned below. (5) The despreading/combining part despreads and linearly combines the sampled signals by use of weighting coefficients and outputs a transformed combined signal and a signal to be multiplied by the weighting coefficients. (6) The coefficient control part receives the signal to be multiplied and the combined signal, and outputs the weighting coefficient calculated by an algorithm that minimizes the average power of the combined signal under a contraint of the weighting coefficient.

In the first despreading/combining part of the signal extraction part, (i) the despreading part despreads the sampled signals by a plurality of despreading codes to obtain a plurality of despread signals and outputs them as signals to be multiplied, and (ii) the linearly combining part multiplies the plurality of despread signals by the weighting coefficients, combines them into a combined signal and outputs the combined signal. These operations are similarly performed in the case of employing, as the above-mentioned spreading codes, a spreading code of a desired signal and one or more spreading codes orthogonal thereto. The second despreading/combining part outputs, as a combined signal, the result of the convolution of the sampled signal and the tap coefficients by the transversal filter and the sampled signal as the signal to be multiplied.

In an extended configuration for diversity reception, a plurality of branch-combined signals are obtained by processing signals in the plurality of branches without changing the basic operation of each part. In the antenna diversity, the plurality of branch combined signals are obtained by processing the signals from the plurality of antenna. On the other hand, in the path diversity, the plurality of branch combined signals are obtained by processing the signal from the single receiving antenna at different timings. The diversity demodulation part demodulates the plurality of branch combined signals and obtains the decision signal. In any diversity configurations, the coefficient control part is supplied with the signal to be multiplied and the combined signal and outputs the weighting coefficients obtained by the algorithm that minimizes the average power of each branch combined signal under the constraint of the weighting coefficients.

In each of the receivers described above, even if the sampling timing is not synchronized with the chip timing of the received signal, the sampling circuit performs the sampling with a sampling timing shorter than the chip timing of the spreading code, so as to prevent the generation of aliasing of the spectrum component of the received signal. In a transmission processing part of a spread spectrum modulation system intended to fully exploit the capabilities of such an adaptive spread spectrum receiver, the signal to be transmitted is subjected to such processing as a multilevel modulation, a band limited modulation, frequency hopping, rise-up control and timing control.

The present invention differs from the prior art in the points listed below.

(1) The despread signal is multiplied by the weighting coefficients to generate the combined signal, while at the same time the despread signal and the combined signal are used to control the weighting coefficients by the algorithm that minimizes the average power of the combined signal under a constraint on the weighting coefficients.

(2) In the configuration employing, as the despreading codes, a spreading code of a desired signal and a plurality of spreading codes orthogonal thereto, a desired signal appears only in the despread signal generated by the spreading code of a desired signal and only interference signals appear in the despread signals generated by the plurality of spreading codes orthogonal to the spreading code of the desired signal.

(3) In the configuration employing the transversal filter, the sequence of sampled signals and the weighting coefficients are convoluted to generate the combined signal, while at the same time the sampled signal sequence and the combined signal are used to control the weighting coefficients by the algorithm that minimizes the average power of the combined signal under a constraint on the weighting coefficients.

(4) In the case of the diversity configuration, when each branch combined signal is generated, the weighting coefficients are controlled by the algorithm that minimizes the average power of the combined signal under a constraint on the weighting coefficients.

As described above, the present invention applies the coefficient-constrained output power minimizing algorithm to the DS-CDMA demodulation processing, not to the array antenna, and operates through use of the algorithm that minimizes the average power of the combined signal under a constraint on the weighting coefficients; hence, the invention does not require a structure for generating an error by using the decision signal and the combined signal as in the prior art.

In the transmission processing part of the spread spectrum modulation system intended to fully bring out the capabilities of the adaptive spread spectrum receiver, it is effective that the signal to be sent be subjected to such processing as multilevel modulation, band limited modulation, frequency hopping, rise-up control and timing control.

BEST MODE FOR CARRYING OUT THE INVENTION

Figure 5:
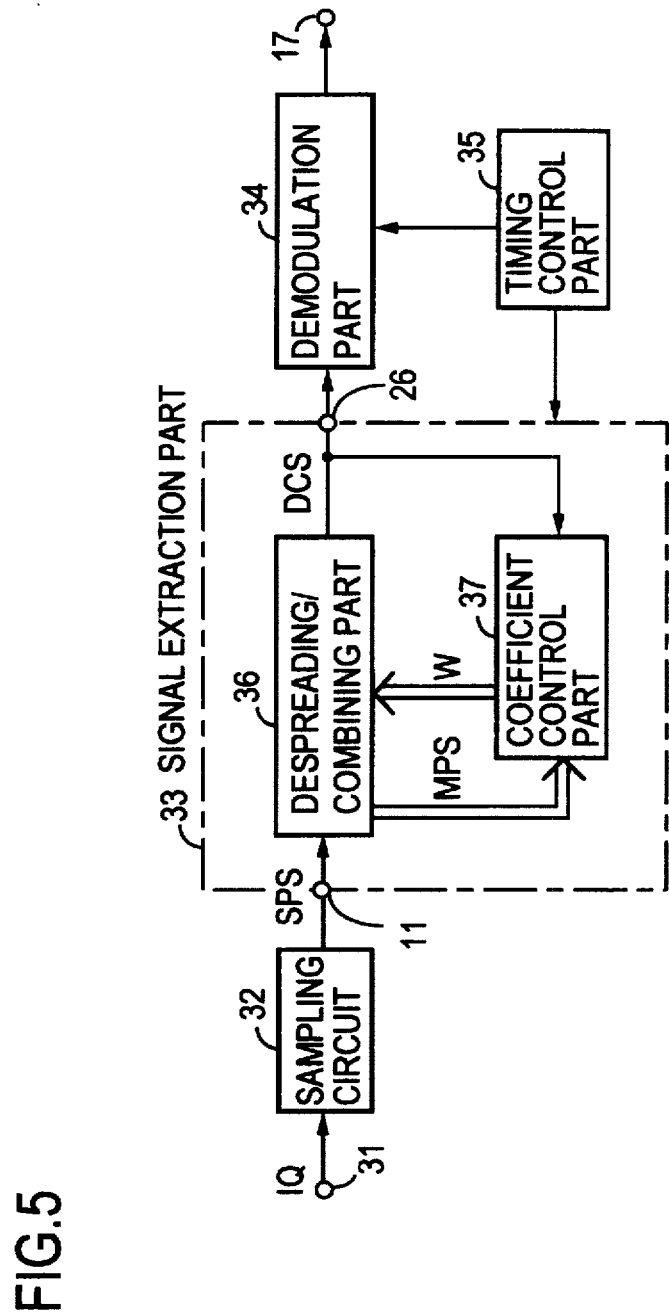
FIG. 5 is a block diagram illustrating the basic configuration of the present invention.

In FIG. 5 there is depicted the basic configuration of the present invention. A received signal IQ composed of in-phase and quadrature components of the received signal is fed via an input terminal 31 to a sampling circuit 32, wherein it is sampled at regular time intervals, and the resulting sampled signals SPS are fed to the terminal 11. A signal extraction part 33 inputs thereinto the sampled signals SPS, and despreads and linearly combines them and outputs the resulting combined signal DCS to the terminal 26. A demodulation part 34 demodulates the combined signal DCS and feeds a decision signal to the terminal 17. A timing control part 35 controls the operation timing of the signal extraction part 33 and the demodulation part 34.

In the present invention, the signal extraction part 33 is composed of a despreading/combining part 36 and a coefficient control part 37, which operate in the following manner. The despreading/combining part 36 despreads and linearly combines the inputted sampled signals by use of the weighting coefficients W to obtain the combined signal DCS and outputs it, while at the same time it outputs a signal MPS to be multiplied by the weighting coefficients W. Then, the coefficient control part 37 inputs thereinto the signal MPS and the combined signal DCS, and obtains the weighting coefficients W by using the algorithm that minimizes the average power of the combined signal DCS under a constraint on the weighting coefficients W; the weighting coefficients thus obtained are fed to the despreading/combining part 36.

The despreading usually takes place over one symbol period, but taking into account the occurrence of timing jitter and the case of asynchronous timing, the processing over a period a little longer than one symbol length may sometimes be effective in the cancellation of interference signals partly because it permits sufficient acquisition of signal energies of the desired and interference signals and partly because the resulting increase in the number of samples causes increased freedom of interference cancellation. In this instance, however, the influence of adjacent symbols appears as intersymbol interference; hence, they must be removed as interference signals.

Various algorithms can be applied to minimize the average power of the combined signal under a constraint on the weighting coefficients W; a known simple scheme is the aforementioned constrained LMS algorithm proposed by Frost. With this scheme, it is possible to avoid the influence of a decision error, since the weighting coefficients W are controlled by an algorithm that does not require the result of decision.

The present invention will hereinafter be described in more detail with reference to its embodiments. The following description will be given of Embodiments 1 to 3 directed to the signal extraction part, Embodiment 4 directed to a specific operative example of the demodulation part, Embodiments 5 to 10 directed to the diversity reception and Embodiment 11 directed to the setting of parameters, followed by a description about the spread spectrum modulation scheme intended to fully exploit the function of the adaptive spread spectrum receiver.

EMBODIMENT 1

Figure 6:
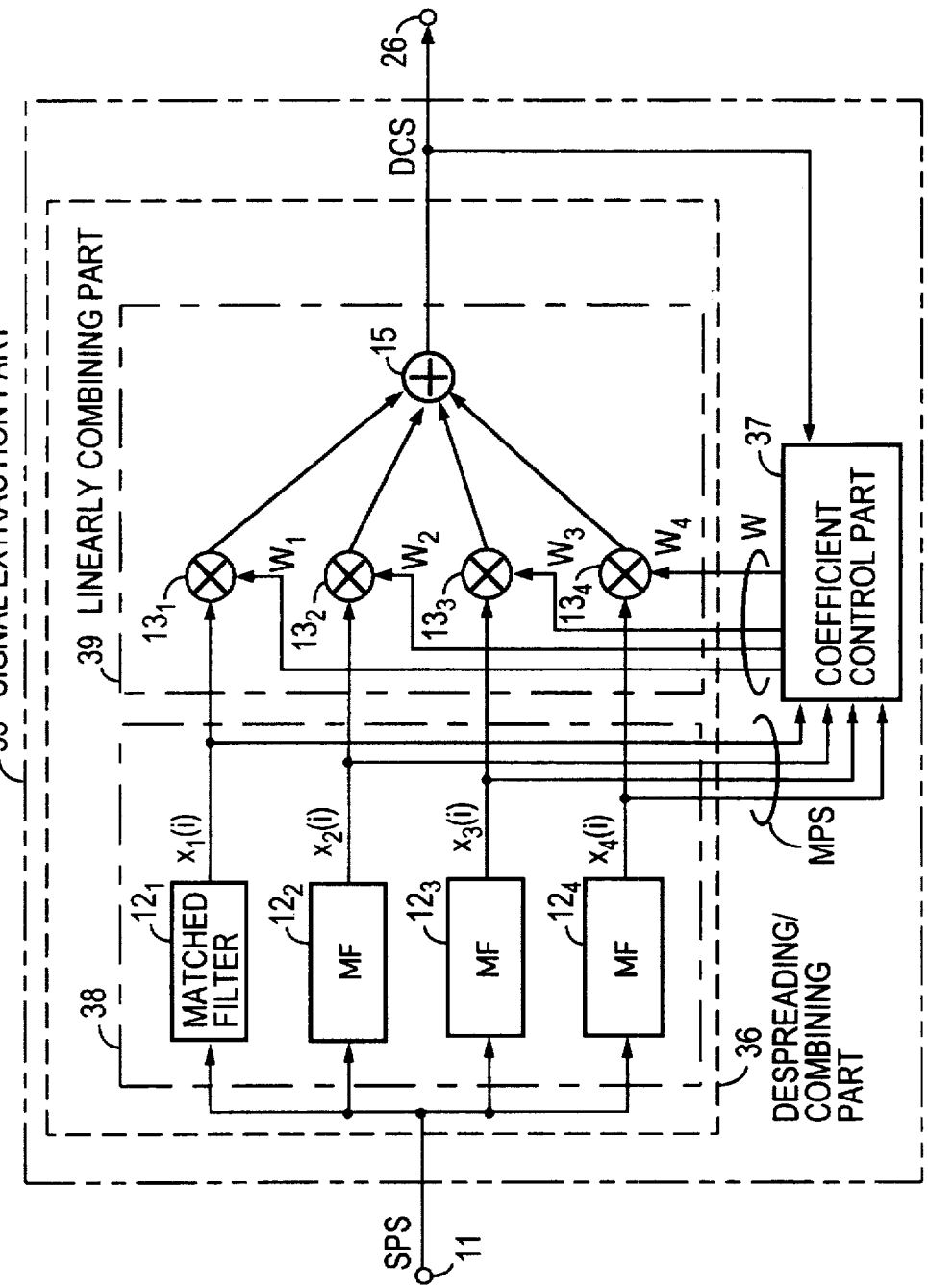
FIG. 6 is a block diagram showing a specific operative example of a signal extraction part 33 in FIG. 5.

In FIG. 6 there is illustrated an example of the configuration of the despreading/combining part 36 wherein a despreading part 38 and a linearly combining part 39 are connected in cascade. The despreading part 38 outputs a plurality of despread signals generated by despreading the input sampled signal SPS with a plurality of despreading codes. At the same time, the plurality of despread signals are outputted as the signals to be multiplied MPS. The linearly combining part 39 multiplies the despread signals outputted by the despreading part 38 by respective weighting coefficients W, then combines the multiplied signals and outputs the combined signal DCS. In FIG. 6 it is assumed, for the sake of brevity, that the process gain Gp (the spreading code chip frequency divided by symbol frequency) is 4 and that the number of users assigned the same frequency is 4.

Figure 1:
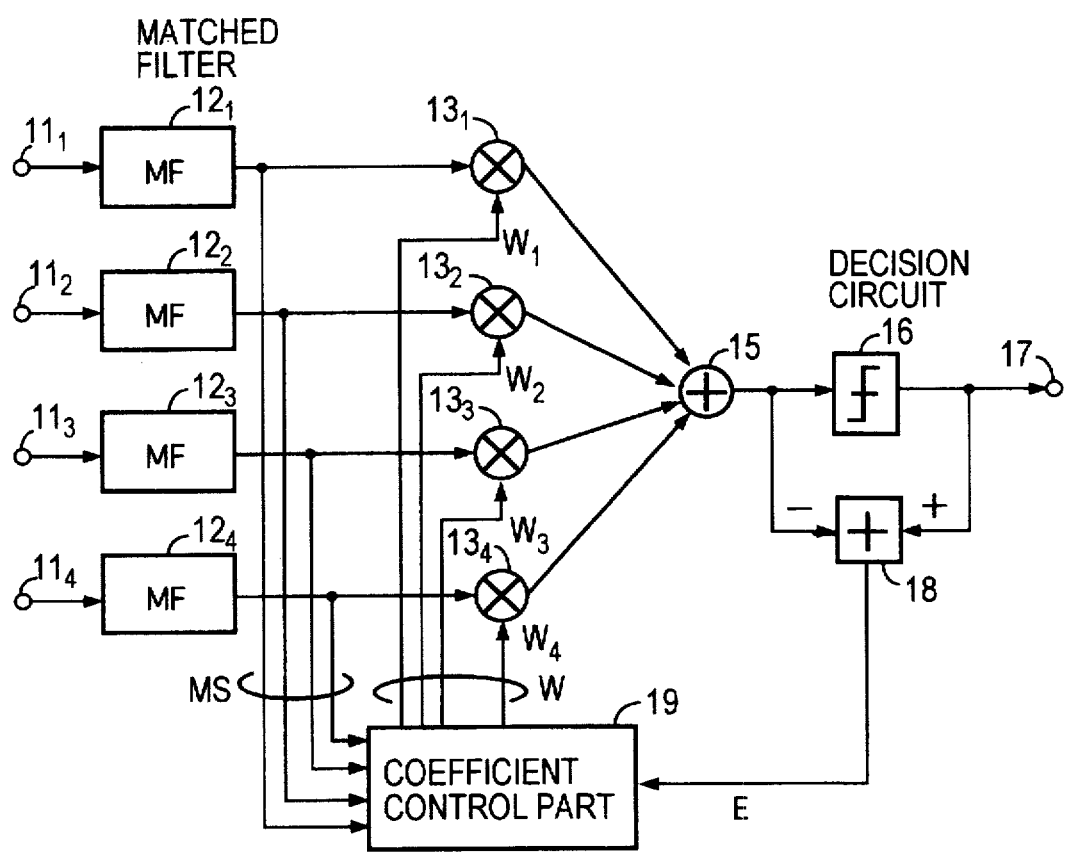
FIG. 1 is a block diagram of a conventional DS-CDMA receiver with an interference cancelling function which employs matched filters and a linearly combining part.
Figure 2:
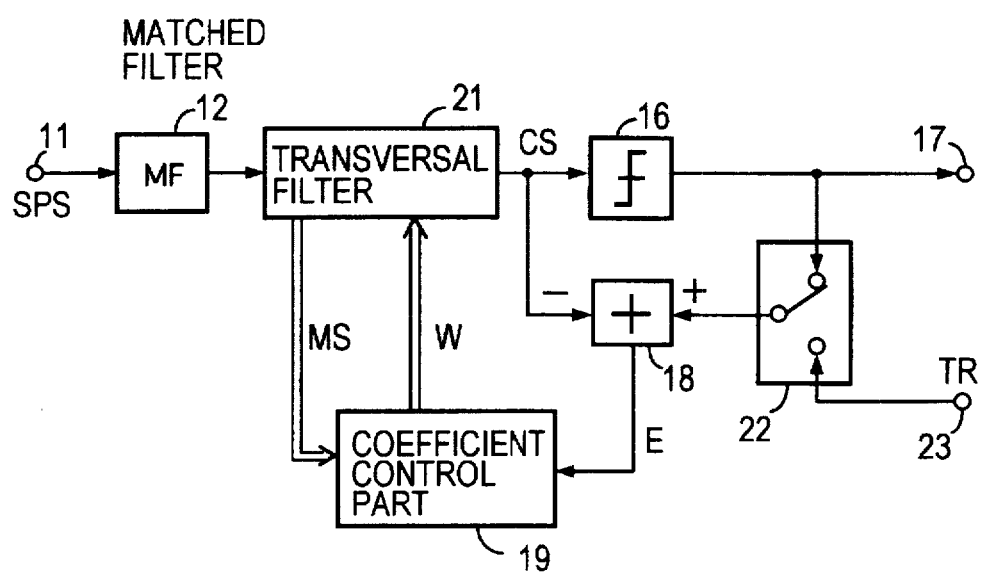
FIG. 2 is a block diagram of a conventional DS-CDMA receiver with the interference cancelling function which employs a transversal filter.
Figure 3:
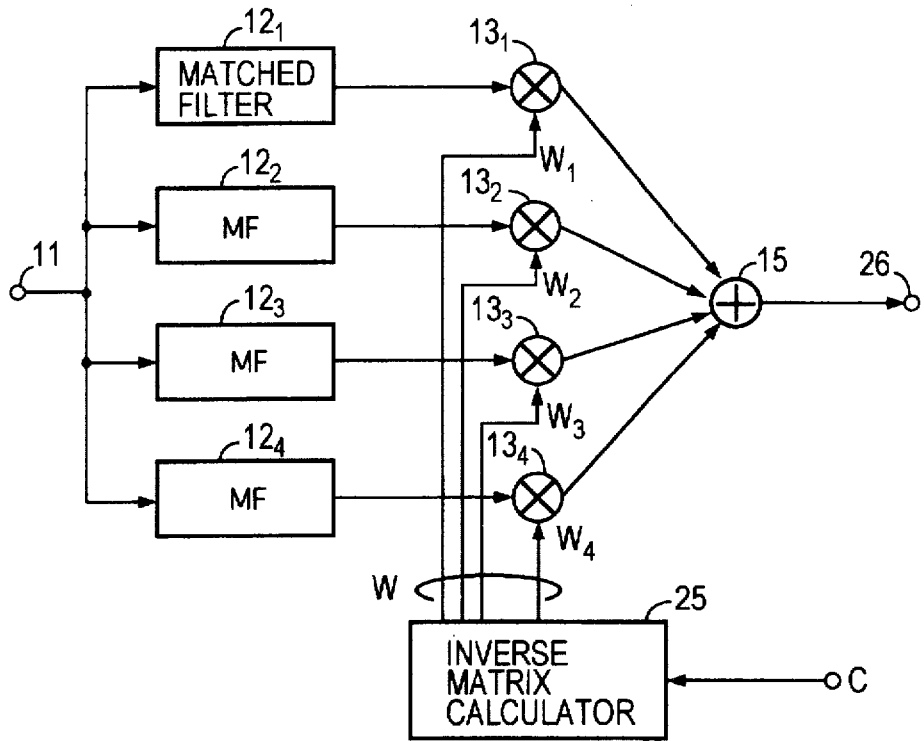
FIG. 3 is a block diagram of a conventional DS-CDMA receiver with the interference cancelling function.

At first, the input sampled signal SPS via the input terminal 11 is fed to the four matched filters $12_1$ to $12_4$ forming the despreading part 38. The matched filters $12_1$ to $12_4$ each calculate the correlation between the sampled signal and the spreading code; the resulting despread signals $x_1(i)$ to $x_4(i)$ at a discrete time instant i are outputted as the signals to be multiplied MPS. In this case, the matched filter $12_1$ uses a spreading code of a desired signal and the other matched filters $12_2$ to $12_4$ each use predetermined spreading codes different from that of the desired signal. Unlike in the prior art example of FIG. 3, the spreading codes for use in the matched filters $12_2$ to $12_4$ need not be the same as those of other users. Furthermore, the spreading code that is used in any one of the matched filters $12_1$ to $12_4$ need not always be the spreading code of the desired signal; the cross-correlation between the spreading code for use in any one of the matched filters and the spreading code of the desired signal needs only to be sufficiently higher than the cross-correlation between the spreading codes for the other matched filters and the spreading code of the desired signal.

The linearly combining part 39 is composed of the multipliers $13_1$ to $13_4$ and the adder 15. The despread signals $x_1(i)$ to $x_4(i)$ of the despreading part 38 are multiplied by the weighting coefficients $w_1$ to $W_4$, respectively, and the multiplied outputs are added together by the adder 15 to obtain the combined signal DCS, which is fed to the output terminal 26. The coefficient control part 37 is supplied with the despread signals $x_1(i)$ to $x_4(i)$ and the combined signal DCS and calculates the weighting coefficients $w_1$ to $W_4$ by the algorithm that minimizes the average power of the combined signal DCS under the weighting coefficient constraint. The matched filters $12_1$ to $12_4$ can be replaced with correlators—this applies to the matched filters described hereinafter.

In this embodiment, letting the optimum value of the four-dimensional weighting coefficient vector $W=[w_1^*, w_2^*, w_3^*, w_4^*]^T$ be represented by $Wo=[wo_1^*, wo_2^*, wo_3^*, wo_4^*]^T$, it is evident from the aforementioned literature by Frost, for example, that the optimum value Wo under the weighting coefficient constraint is given by the following equation. In the above, the symbol * denotes a complex conjugate and $^T$ transposition.

$$Wo = \alpha R^{-1} S \qquad (1)$$

where $\alpha$ a scalar value, R is a four-by-four correlation matrix of the despread signals and S is a four-dimensional steering vector. Using a despread signal vector $X(i)=[x_1(i), x_2(i), x_3(i), x_4(i)]^T$, the correlation matrix R is given as follows:

$$R = \langle X(i) x^H(i) \rangle \qquad (2)$$

where i is a discrete time instant using the symbol duration T as a unit, $wo_j$ is the optimum value of the weighting coefficient $w_j$, $x_j(i)$ is the despread signal of a j-th matched filter $12_j$ (j=1, 2, 3, 4) at the time instant i, $^H$ denotes complex conjugate transposition and $\langle \rangle$ denotes an ensemble average. The matrix R can be approximated as follows:

$$R = [X(1)X^H(1) + X(2)X^H(2) + \ldots + X(N_r)XH(N_r)]/N_r \qquad (3)$$

where $N_r$ is a large natural number. The larger the number $N_r$, the higher the approximation accuracy; though dependent on the system, the natural number $N_r$ may preferably be set to a value such that a change in the communication conditions, such as the initiation of communication by another user, will not occur during the period $N_r$.

The steering vector S is, in this case, a vector whose element is the cross-correlation $\rho_{jk}$ between the spreading code j (j=1) of the desired signal and the spreading code k that is used in the matched filter $12_k$ and it is given as follows:

$$S = [\rho 11, \rho 12, \rho 13, \rho 14]^T \qquad (4)$$

The rate at which the desired signal is contained in the output of the multiplier $13_1$ is $wo_{1\rho 11}$. Similarly, the rates at which the desired wave is contained in the outputs of the multipliers $13_2$ to $13_4$ are $wo_{2\rho 12}$, $wo_{3\rho 13}$ and $wo_{4\rho 14}$, respectively. Since the combined signal DCS is the sum of the outputs of the multipliers $13_1$ to $13_4$, the rate at which the desired signal is contained in the combined signal DCS is $(wo_{1\rho 11} + wo_{2\rho 12} + wo_{3\rho 13} + wo_{4\rho 14})$, which corresponds to $W^H S$. When the weighting coefficients are controlled so that the signal level of the desired signal contained in the combined signal remains constant, the constraint on the weighting coefficients is expressed as follows:

$$W^H S = 1 \qquad (5)$$

Minimizing the average power of the combined signal under this constraint is equivalent to minimizing the average power of the combined signal while holding the signal level of the desired signal constant. Such control of the weighting coefficient permits minimization of the level of the interference component that is contained in the combined signal. Incidentally, $\alpha$ in Eq. (1) is set so that Wo satisfies the constraint given by Eq. (5).

As algorithms for requiring the optimum value Wo, there are a method of calculating it directly by using Eqs. (1), (3) and (4) and a method of calculating it in a recursive form. The recursive form can be derived by use of a theory which utilizes the lemma of an inverse matrix about R.N$_r$, taking into account the constraint on the weighting coefficient W. The algorithm thus derived is such as follows:

$$Y(i)=W^H(i-1)X(i) \quad (6)$$

$$K(i)=[P(i-1)X(i)]/[1+X^H(i)P(i-1)X(i)] \quad (7)$$

$$W(i)=\beta_i W(i-1)-\beta_i K(i)Y^*(i) \quad (8)$$

$$P(i)=P(i-1)-K(i)X^H(i)p(i-1) \quad (9)$$

where Y(i) is the combined signal, P(i) is the inverse matrix of R.N$_r$ at the time instant i, K(i) is the Kalman gain vector and $\beta i=i/(i-1)$, where $i \leq 2$. In the steady state, W(i) converges to $\alpha^{-1}$Wo which is a constant multiple of Wo expressed by Eq. (1). Whether it converges to $\alpha^{-1}$Wo or Wo, the ratio between the signal power of the desired signal and that of the interference signals contained in the combined signal remains unchanged and the transmission performance also remains unchanged accordingly. Therefore, a description will be given of the calculation of $\alpha^{-1}$Wo which involves less computational complexity. In this recursive form the steering vector is contained in the initial condition {W(1)=P(1)S}.

The above method is highly accurate but requires a large amount of processing. An algorithm that requires less computational complexity is the constrained steepest descent method by Frost; the algorithm is shown below.

$$W(i) = \left[ I - \frac{SS^H}{S^H S} \right] [W(i-1) - \mu X(i)Y^*(i)] + \left[ \frac{S}{S^H S} \right] \quad (10)$$

where μ is the step size and is a small positive real value and I is an identity matrix. W(i) converges to Wo in the steady state.

When the correlation matrix R becomes as large as a 100 by 100 one, the amount of processing involved is appreciably large in the direct calculation method but relatively small in the constrained steepest descent method. The present invention is not limited specifically to these methods but may utilize various other constrained average output minimization algorithms.

EMBODIMENT 2

Figure 7:
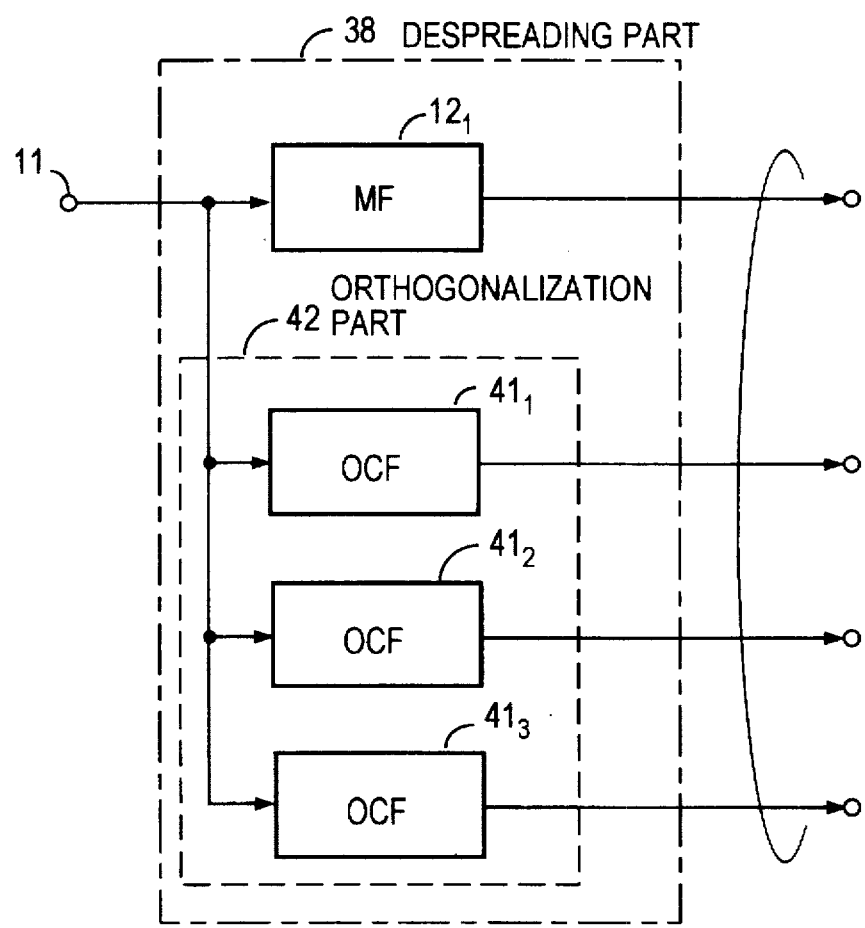
FIG. 7 is a block diagram showing an example of a configuration of a despreading part 38 in FIG. 6.

In FIG. 7 there is illustrated the configuration of the despreading part which is employed in the case of using, as the despreading codes in Embodiment 1, the spreading code of the desired signal and a plurality of codes orthogonal thereto.

The despreading part 38 is formed by the matched filter 12$_1$ and orthogonal code filters (OCF) 41$_1$ to 41$_3$; the matched filter 12$_1$ is assigned the spreading code of the desired signal and the orthogonal code filters 41$_1$ to 41$_3$ are assigned spreading codes that are orthogonal to the spreading code of the desired signal and orthogonal to one another. The orthogonal code filters constitute an orthogonalization part 42. In the orthogonalization part 42 there is no need of using the same spreading codes as those of other users.

When spread with the process gain Gp, a modulated signal usually forms a Gp-dimensional space. Then, at most, Gp orthonormal basic vectors of the Gp dimension can be produced on the base of the spreading code of the desired signal. More specifically, one Gp-dimensional vector whose elements are the same as all chips of the spreading code of the desired signal is generated first and then it is used to calculate (Gp–1) Gp-dimensional orthonormal basic vectors by the Gram-Schmidt orthogonalization method or the like. Codes which have, as their chips, the elements of the thus calculated Gp–1 orthonormal basic vectors of the Gp dimension are used as the despreading codes in the orthogonalization part 42.

Even when the spreading code of the desired signal is used as the despreading code for the matched filter 12$_1$, signal components of the desired and the interference wave are contained in the despread signal component. In such an instance, however, the signal component of the desired signal is not contained in the output signals of the orthogonalization part 42 but only the signal components of the interference signals are contained. By fixing the weighting coefficient for the output signal of the matched filter 12$_1$ as a constant and controlling the weighting coefficients in such a manner as to minimize the power of the combined signal, it is possible to keep constant the power of the signal component of the desired signal contained in the combined signal and minimize the power of the signal component of the interference signals in the combined signal. The optimum value Wo of the four-dimensional weighting coefficient vector in this case is calculated in the same manner as in the aforementioned embodiment. In this instance, however, since there is no correlation between the despreading codes in the orthogonalization part 42 and the spreading code of the desired signal, the steering vector S becomes as follows:

$$S=[1, 0, 0, 0]^T \quad (11)$$

When the steering vector S is set to such a value as given by Eq. (11), the coefficient constraint corresponds to setting Wo$_1$=1. The same algorithms as referred to previously in respect of Embodiment 1 can be applied to calculate the optimum value Wo.

As described above, the orthogonalization part 42 uses the codes orthogonal to the spreading code of the desired signal; hence, no matter how much the spreading codes of other users vary, it is possible to accurately project into the orthogonal space interference signal components of other users and hence appropriately adapt to variations in the use of spreading codes of other users.

EMBODIMENT 3

Figure 8:
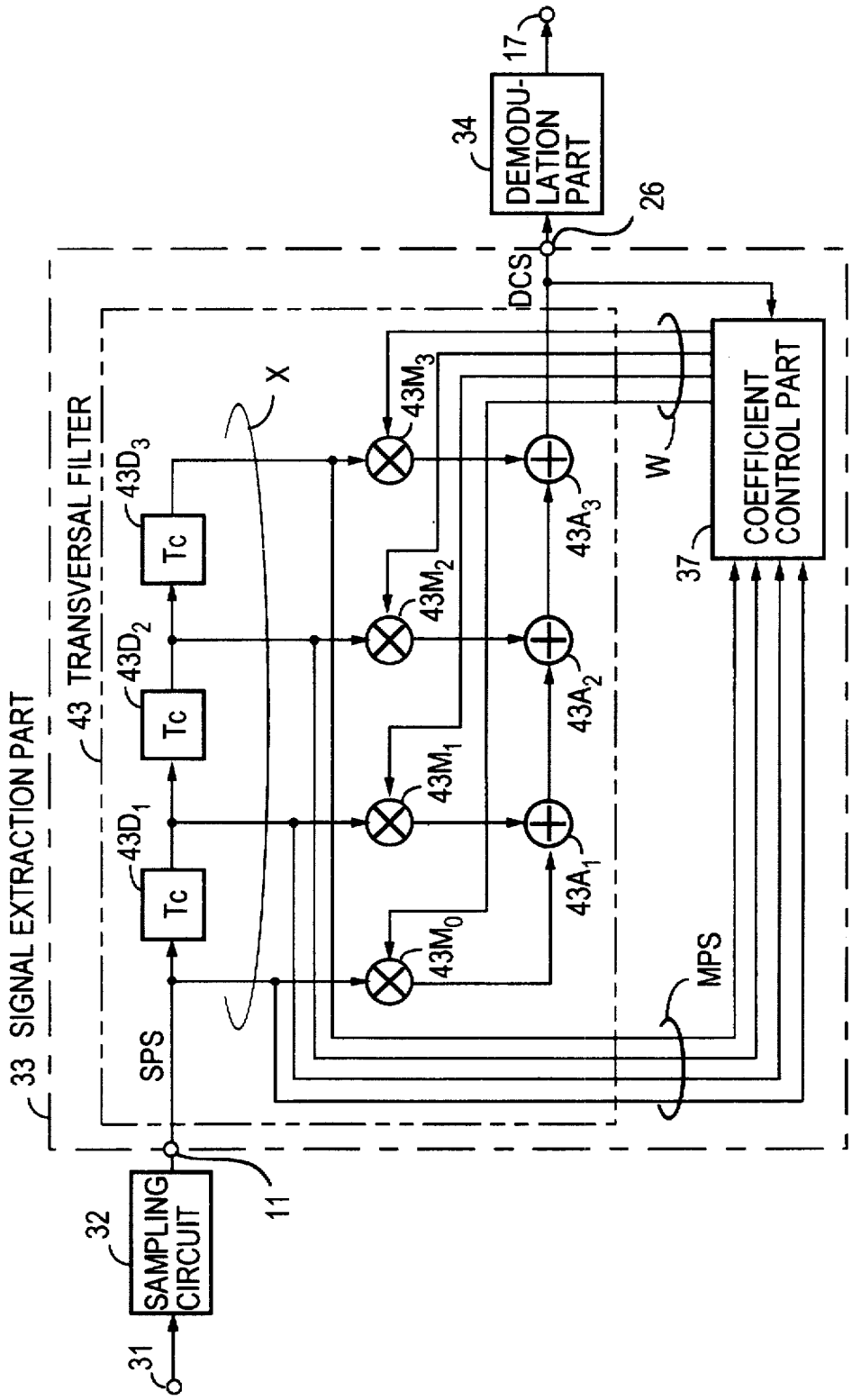
FIG. 8 is a block diagram illustrating an embodiment in which a despreading/combining part 36 in FIG. 5 is formed by a transversal filter.

In FIG. 8 there is illustrated a configuration which implements the despreading/combining part 36 by using a transversal filter. With this configuration, the result of convolution of the sampled signal SPS and the tap coefficient W of a transversal filter 43 is provided as the combined signal and the input sampled signal is outputted as the signal to be multiplied MPS. The sampled signal sequence set in the transversal filter 43 corresponds to the signal to be multiplied MPS and the tap coefficient to the weighting coefficients W.

The received signal is fed via the input terminal 31 to the sampling circuit 32, which samples it and outputs the sampled signal SPS. The signal extraction part 33 receives the sampled signal SPS, performs the despreading and linearly combining operations and outputs the combined signal. The demodulation part 34 demodulates the combined signal and feeds the decision signal to the output terminal 17. The signal extraction part 33 comprises the transversal filter 43 and the coefficient control part 37. The transversal filter 43 comprises: a plurality of cascade-connected delay elements $43D_1$, $43D_2$ and $43D_3$ each having a delay time equal to one chip duration Tc; multipliers $43M_0$ to $43M_3$ for multiplying the input of the first delay stage $43D_1$ and the outputs of the respective delay elements by the tap coefficients W ($w_1$, $w_2$, $w_3$, $w_4$); and adders $43A_1$, $43A_2$ and $43A_3$ for adding the multiplied outputs. The transversal filter 43 operates equivalently to the combination of the despreading part 38 and the linearly combining part 39 in FIG. 6; it convolutes the sampled signal SPS and the tap coefficients W and outputs the combined signal DCS. The coefficient control part 37 inputs thereinto the sampled signal MPS set in the transversal filter 43 and the combined signal DCS and calculates the tap coefficients W by the algorithm that minimizes the average power of the combined signal DCS under the constraint on the tap coefficients W.

With the scheme using the transversal filter 43, since this filter possesses the function of the despreading part 38 including the orthogonalization part 42 in FIG. 6, the steering vector S becomes the product of a vector $C_1$ using the spreading code of the desired signal as its elements and the identity matrix I; this is expressed by the following equation.

$$S = IC_1 = C_1 \qquad (12)$$

The rate of the desired signal component in the output of the transversal filter 43 can be expressed by $W^H C_1$; it will be seen that this component could be held constant by using $C_1$ in place of S in $W^H S = 1$ of Eq. (5) which shows the constraint on the weighting coefficients. The algorithms that can be used to calculate the optimum value Wo are the same as those mentioned previously with reference to Embodiment 1.

As described above, the configuration of FIG. 8 uses the transversal filter to carry out the despreading and combining operations at one time, and hence can reduce the amount of processing required.

EMBODIMENT 4

Figure 9:
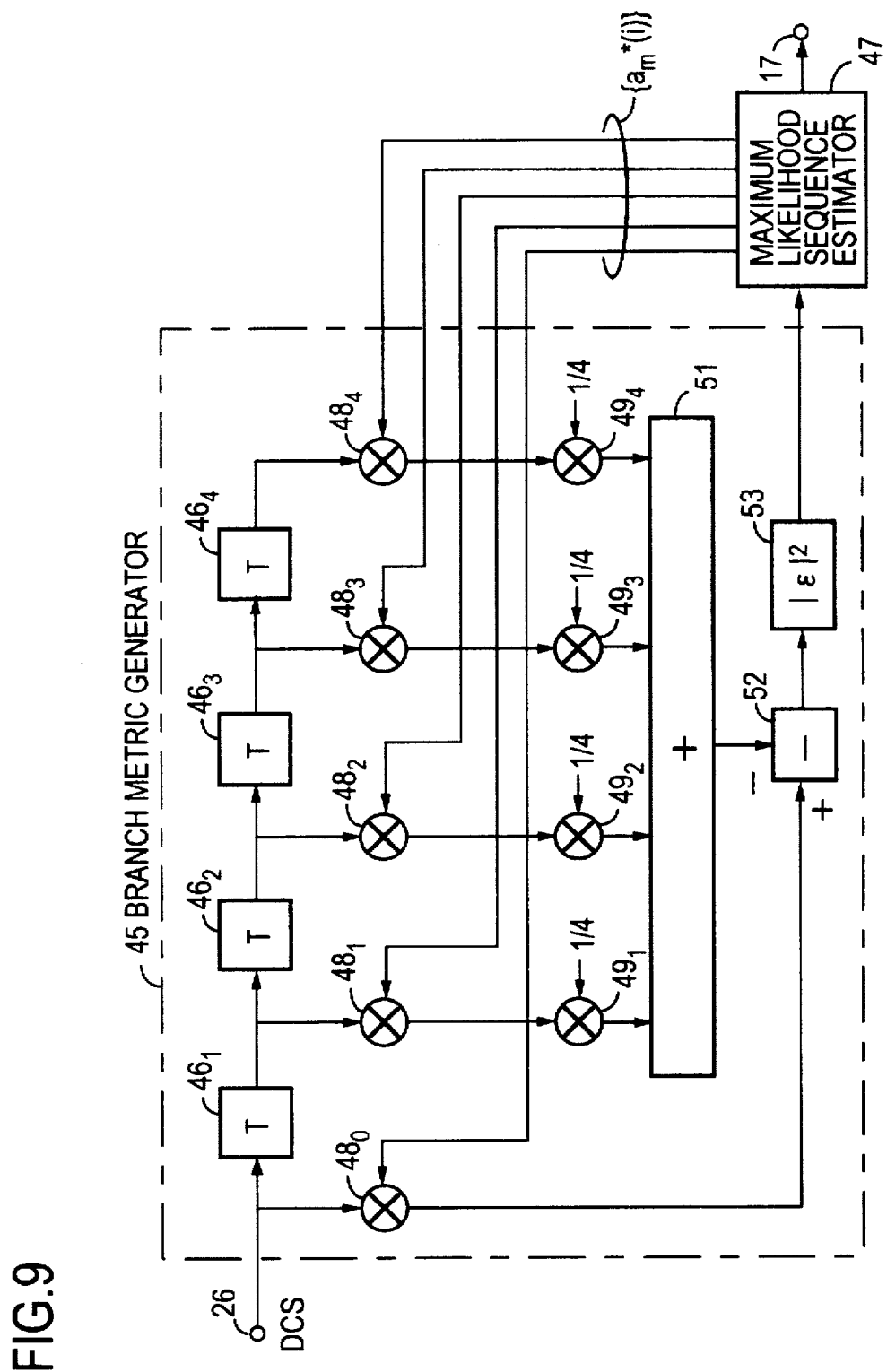
FIG. 9 is a block diagram showing a predictive synchronous detector which is used as a demodulation part 38.

The demodulation part in the present invention can employ differential detection and coherent detection techniques. In FIG. 9 there is illustrated a scheme that performs the coherent detection which employs a predictive algorithm and a maximum likelihood sequence estimation (Kazuhiko Fukawa and Hiroshi Suzuki, "Coherent Detection with Predictive Channel Estimation," Technical Report of IEICJ, vol. RCS-92, No. 93, pp. 53–58, November 1992).

The combined signal DCS is inputted into a branch metric generator 45 via the input terminal 26. A combined signal at the current time kT and combined signals at times (k−1)T to (k−4)T respectively set in four delay circuits $46_1$ to $46_4$, each having a delay time equal to one symbol duration T, are inversely modulated by a symbol sequence candidate {$a_m$(k)} which is fed by a maximum likelihood sequence estimator 47, whereby inversely modulated signals are generated. Incidentally, the modulation scheme in this example is a modulation scheme in which the amplitude |a(k)| is constant as in the PSK modulation, and the inverse modulation processing can be done by multiplying the combined signal DCS by a complex conjugate {$a_m^*(k)$} of the symbol sequence candidate in multipliers $48_1$ to $48_4$. Next, multipliers $49_1$ to $49_4$ and an adder 51 estimate an inversely modulated signal at the time kT by using the inversely modulated signals at times (k−1)T to (k−4)T and output an inversely modulated signal estimated value. Assuming that the channel variation is slow, the coefficients of the multipliers $49_1$ to $49_4$ need only to be set to such a value as for averaging, ¼ in this example. When the symbol sequence candidate {$a_m$(k)} coincides with the true value of the transmitted symbol sequence, the inversely modulated signals approximately coincide with the carrier signal; consequently, the above-mentioned average value that is fed by the adder 51 becomes the carrier component of the received signal.

A subtractor 52 detects and outputs a difference ε between the inversely modulated signal at time kT, the output of a multiplier $48_0$ which has multiplied the input sampled signal SPS, by the complex conjugate $a_m^*(k)$ of a complex symbol candidate at time kT and the inversely modulated signal estimated value (the output from the adder 51). The output ε is squared by a square calculator 53, by which the squared output is fed as a likelihood information signal to the maximum likelihood sequence estimator 47. The maximum likelihood sequence estimator 47 uses the likelihood information signal to calculate a log likelihood function, then selects by the Viterbi algorithm a symbol sequence candidate that maximizes the log likelihood function, and outputs it as the decision signal to the output terminal 17. While this embodiment has been described to employ the four delay circuits $46_1$ to $46_4$, the number of delay circuits is not limited specifically to four but may also be extended to L(L≧1).

The above has been given of the scheme that employs the predictive algorithm and the maximum likelihood sequence estimation, but when the channel variation is very fast, the use of the differential detection technique may sometimes provide excellent performance. Accordingly, it is also possible to use a method that switches between the coherent detection and the differential detection in accordance with the channel characteristic.

Figure 4:
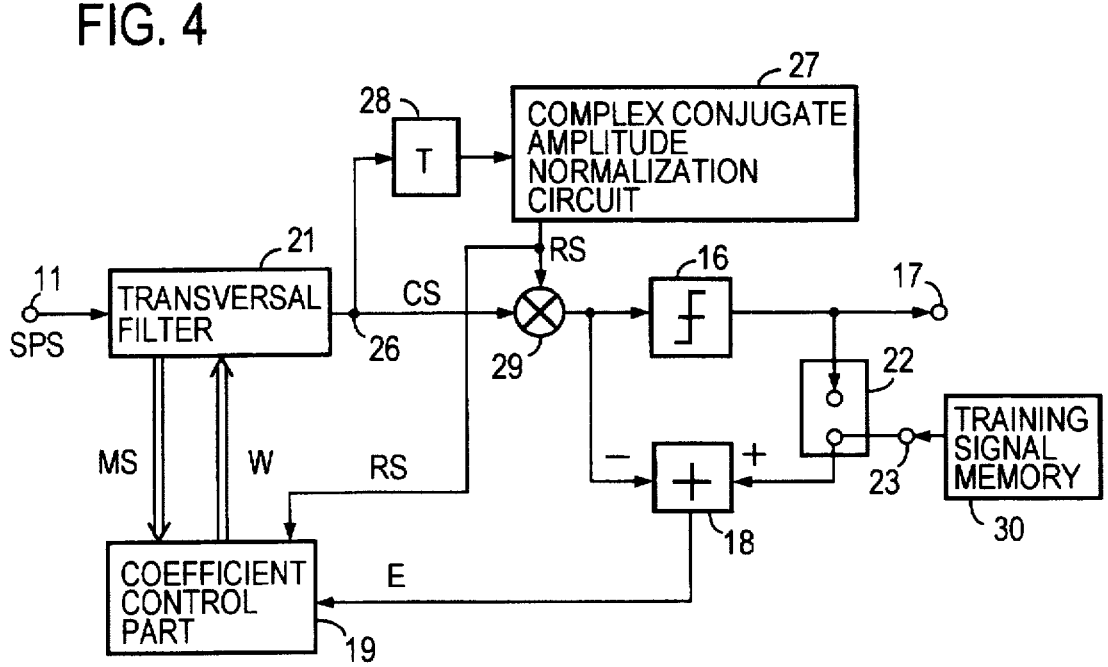
FIG. 4 is a block diagram of an another conventional DS-CDMA receiver with the interference cancelling function which employs a transversal filter.
Figure 10:
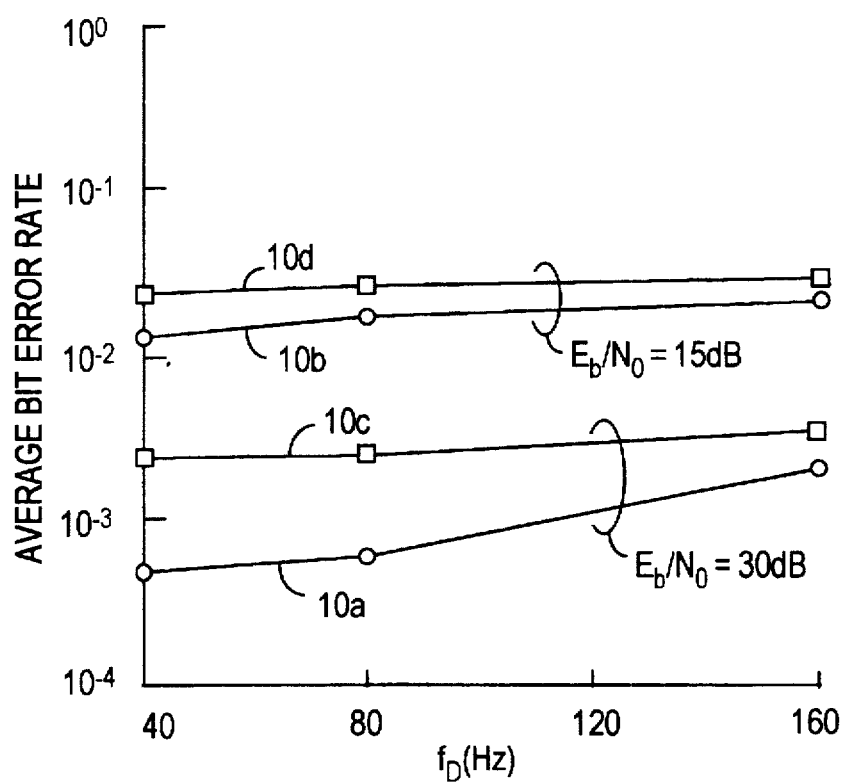
FIG. 10 is a graph showing the results of computer simulations.

In FIG. 10 there are indicated by the curves 10a and 10b the results of the average bit error rate performance by computer simulations conducted to demonstrate the effectiveness of the present invention. The abscissa represents the maximum Doppler shift frequency $f_D$ of the received signal which is caused by the movement of the receiver, and $E_b/N_o$ represents the received signal power versus noise power ratio per bit. In the computer simulations, the orthogonalization was done by the configuration of Embodiment 2 (FIG. 7) and the predictive coherent detector depicted in FIG. 9 was used as the demodulation part 34. For the purpose of comparison, the results of the average bit error rate performance obtained by employing the DS-CDMA adaptive interference canceller shown in FIG. 4 are indicated by the curves 10c and 10d. The process gain Gp used was 16, the number of users was 16 and the received timing of each user was assumed to be synchronized with one another. The modulation scheme used is a 10 kb/s BPSK modulation and the spreading codes used are those which have a cross-correlation under 0.25. The channel model is a Rayleigh fading model. It will be seen from FIG. 10 that the present invention is superior to the conventional DS-CDMA adaptive interference canceller.

EMBODIMENT 5

Figure 11:
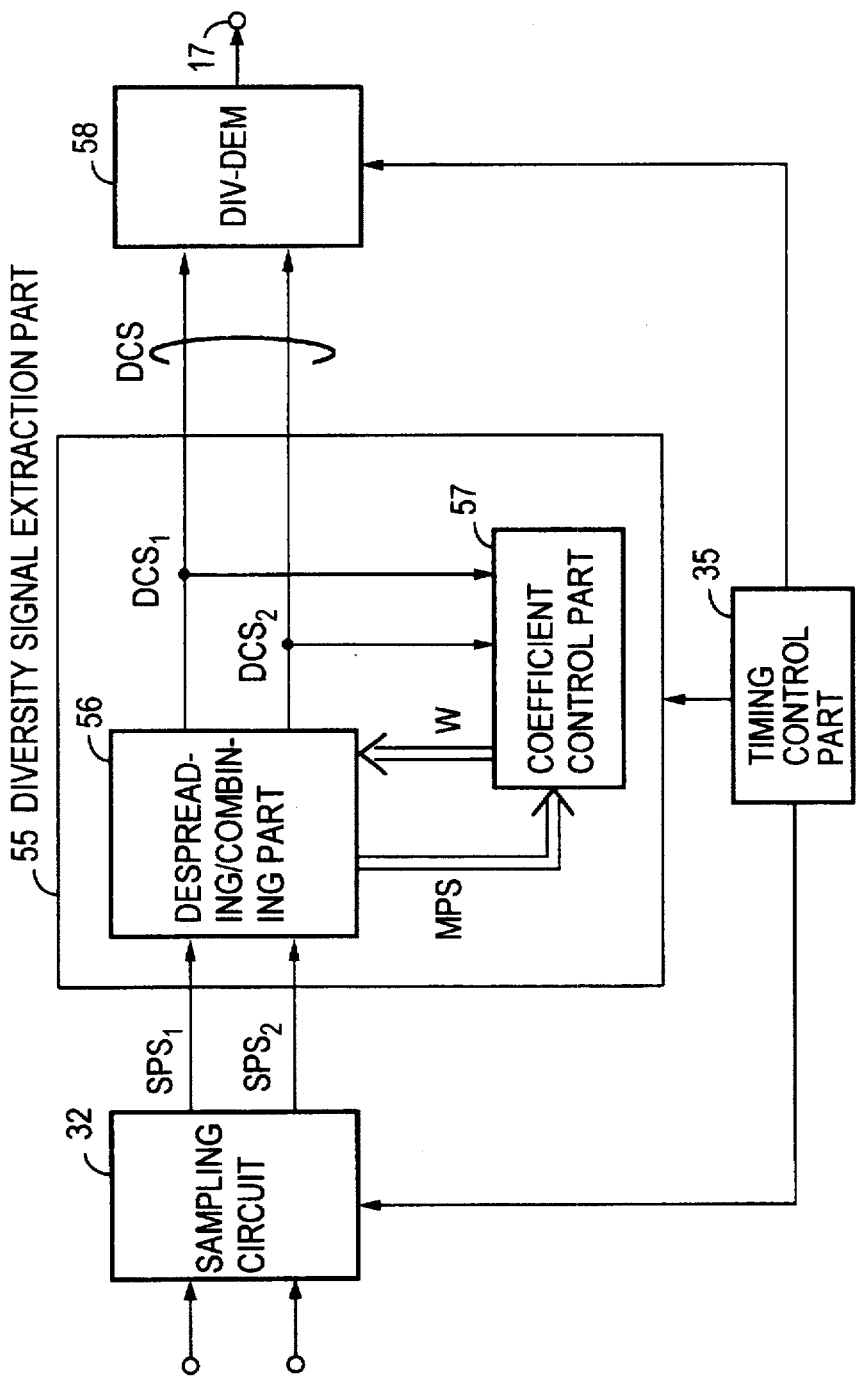
FIG. 11 is a block diagram illustrating an embodiment of the present invention applied to diversity reception.

In mobile radio communications, the diversity reception scheme is utilized with a view to suppressing severe degradation of the transmission performance by the fading-induced variation of the propagation path. FIG. 11 illustrates an embodiment of the present invention applied to the diversity reception. The sampling circuit 32 samples one or more received signals at regular time intervals and outputs one or more sampled signals. In the case of antenna diversity, a plurality of received signals are handled, whereas in the case of path diversity, a single received signal is handled. The illustrated example is a two-branch antenna diversity scheme. A diversity signal extraction part 55 comprises a despreading/combining part 56 which inputs thereinto sampled signals $SPS_1$ and $SPS_2$ and despreads and linearly combines them, and a coefficient control part 57; the diversity signal extraction part outputs a plurality of branch combined signals DCS. The despreading/combining part 56 and the coefficient control part 57 are similar to the despreading/combining part 36 and the coefficient control part 37 in FIG. 6, but the diversity signal extraction part differs from the signal extraction part in FIG. 6 in that the former outputs the plurality of branch combined signals $DCS_1$ and $DCS_2$. A diversity demodulation part (DIV-DEM) 58 combines and demodulates the plurality of branch combined signals $DCS_1$ and $DCS_2$ and outputs a decision signal. The timing control part effects timing control for each part.

Figure 12A:
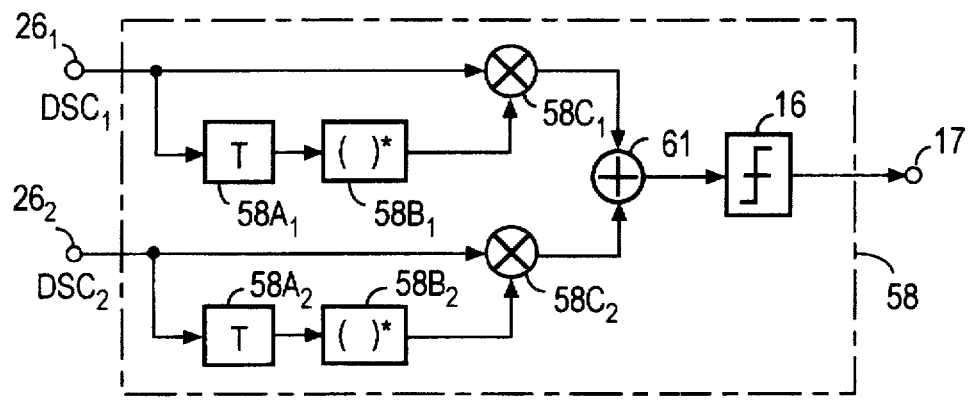
FIGS. 12A–12C illustrates examples of the configuration of a diversity demodulation part 58.
Figure 12B:
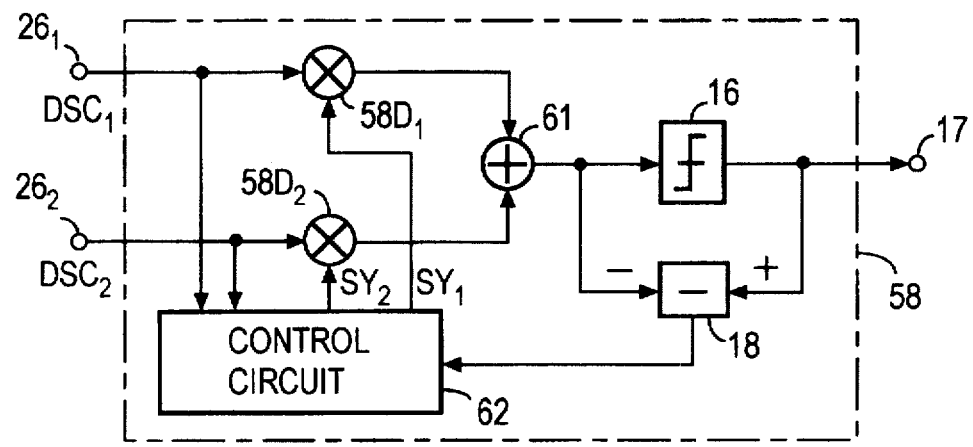
Figure 12C:
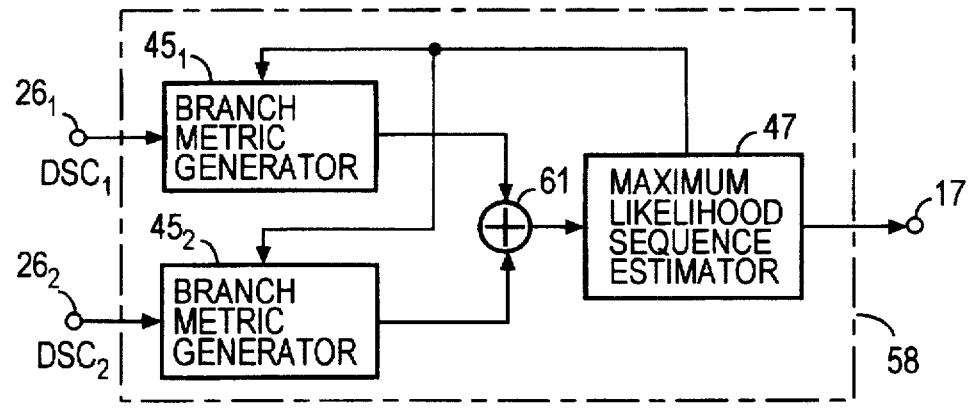

FIGS. 12A, 12B and 12C illustrate examples of the construction of the diversity demodulation part 58 for use in the two-branch diversity reception scheme. These examples are conventionally known. In FIG. 12A there is shown an extended differential detection structure. The combined signals $DCS_1$ and $DCS_2$, which are inputted via input terminals $26_1$ and $26_2$ for respective diversity branches, and signals, which are generated by delaying the combined signals for one symbol duration T in delay elements $58A_1$ and $58A_2$ and subjecting the delayed signals to a complex conjugate calculation in complex conjugate calculation parts $58B_1$ and $58B_2$, are multiplied by multipliers $58C_1$ and $58C_2$, respectively; thus, the received signal is differentially detected. The multiplied outputs are added together by an adder 61, and the added output is fed to the decision circuit 16, which makes the signal decision by hard decision and provides the decision signal to the output terminal 17.

FIG. 12B shows an extension of the coherent detection to the diversity reception scheme. The combined signals $DCS_1$ and $DCS_2$, which are inputted via the input terminals $26_1$ and $26_2$ for respective diversity branches, are fed to multipliers $58D_1$ and $58D_2$, which multiplies them by estimated carrier synchronizing signals $SY_1$ and $SY_2$ from a control part 62, respectively, and outputs carrier-phase-synchronized signals. The multiplied signals are added together by the adder 61, whose added output is fed to the decision circuit 16. The decision circuit 16 makes the signal decision by hard decision and provided the decision signal to the output terminal 17. The subtractor 18 outputs, as an estimation error signal, the difference between the input of the decision circuit 16 and the output therefrom. A control circuit 62 is supplied with the estimation error signal outputted by the subtractor 18, the combined signals $DCS_1$ and $DCS_2$ via the input terminals $26_1$ and $26_2$, and estimates the above-mentioned estimated carrier synchronizing signals $SY_1$ and $SY_2$ so that the square of the absolute value of the estimation error becomes minimum.

FIG. 12C illustrates an extension of the predictive coherent detection of FIG. 9 to the diversity reception scheme. Branch metric generators $45_1$ and $45_2$, which are identical in construction to that in FIG. 9, are each set for each diversity branch; these branch metric generators are supplied with the combined signals $DCS_1$ and $DCS_2$, respectively, and the symbol sequence candidate outputted by the maximum likelihood sequence estimator 47 in common to them and outputs the likelihood information signals. The maximum likelihood sequence estimator 47 calculates the log likelihood function on the basis of the likelihood information signals, then selects by the Viterbi algorithm a symbol sequence candidate that maximizes the log likelihood function, and feeds it as the decision signal to the output terminal 17.

With such diversity configurations, it is possible to offer fading-resistant receivers for mobile radio communications.

EMBODIMENT 6

Figure 13:
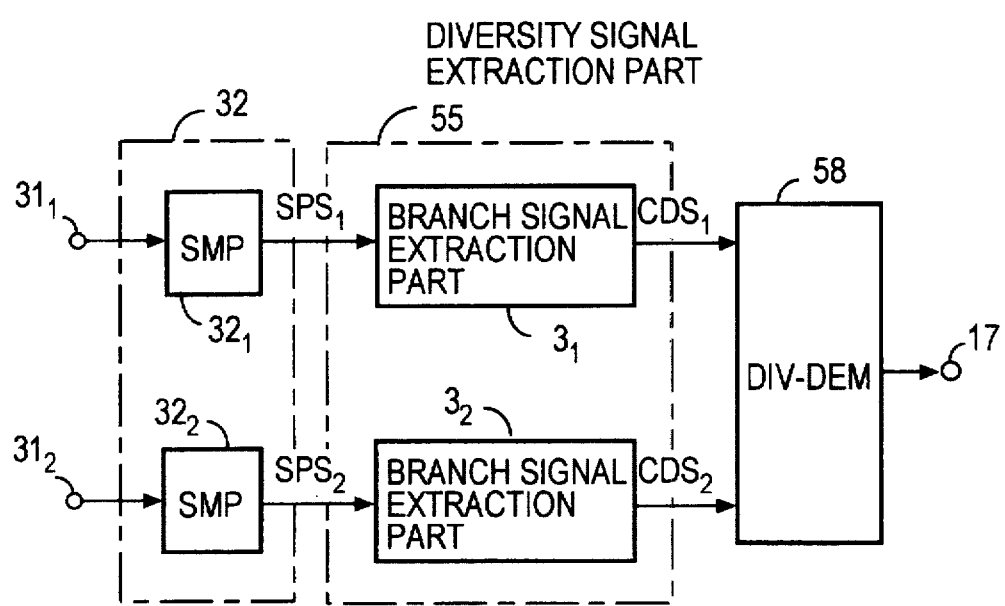
FIG. 13 is a block diagram illustrating another embodiment of the present invention applied to antenna diversity reception.

In FIG. 13 there is illustrated a concrete embodiment for the antenna diversity scheme. In the antenna diversity scheme, the sampling circuit 32 receives, as a plurality of received signals, the signals generated from the received waves of a plurality (two in this example) of antennas and outputs a plurality of sampled signals $SPS_1$ and $SPS_2$ sampled in sampling parts (SMP) $32_1$ and $32_2$. In the diversity signal extraction part 55, branch signal extraction parts $33_1$ and $33_2$, each composed of the despreading/combining part 36 and the coefficient control part 37 described previously in respect of FIGS. 5, 6 and 7, are set corresponding to the sampled signals, respectively; the diversity signal extraction part outputs a plurality of branch combined signals $DCS_1$ and $DCS_2$. Incidentally, the branch signal extraction parts $33_1$ and $33_2$ may each be formed by the signal extraction part 33 with the transversal filter 43 described previously with respect to FIG. 8.

It is an example of the two-branch antenna diversity scheme that is depicted in FIG. 13. Received signals of first and second diversity branches are inputted into the sampling circuit via input terminals $31_1$ and $31_2$. The received signals of the respective diversity branches are sampled by the sampling circuits $32_1$ and $32_2$ and the sampled signals are fed to the branch signal extraction parts $33_1$ and $33_2$, by which the combined signals $DCS_1$ and $DCS_2$ are generated. The diversity demodulation part 58 combines the combined signals $DCS_1$ and $DCS_2$ of the respective diversity branches and demodulates the combined signals, then outputs the decision signal to the output terminal 17. While this embodiment has been described in the case of the two-branch diversity reception scheme, an extension to the diversity reception scheme with three or more branches can be implemented with ease.

With the diversity scheme with such an increased number of antennas, the received signal energy of the desired signal increases with the number of branches used and the variation of the entire received signal energy becomes less—this substantially improves the transmission performance.

EMBODIMENT 7

Figure 14:
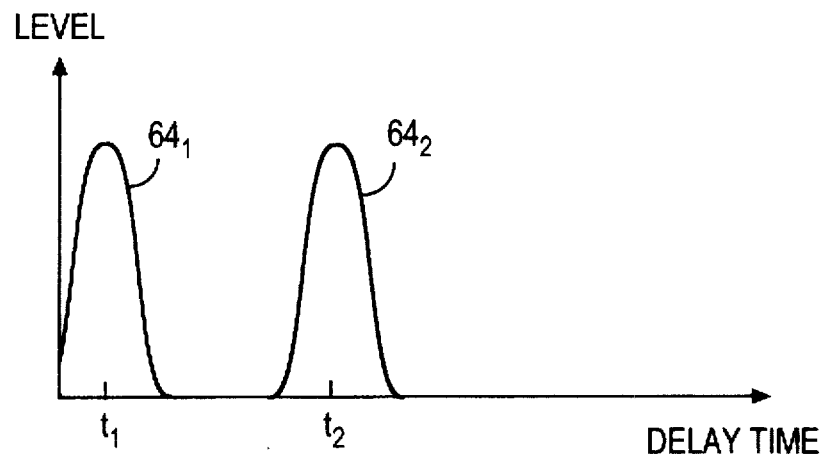
FIG. 14 is a graph for explaining the reception timing of a direct path and a delayed path of a desired signal.

When the When the transmitted wave propagates over two different paths of a multipath channel, the impulse response can be expressed by two impulses $64_1$ and $64_2$ as shown in FIG. 14. The wave that propagates over a path 1 reached the receiving end with a delay time $t_1$; the wave that propagates over a path 2 reaches the receiving end with a delay time $t_2$.

Figure 15:
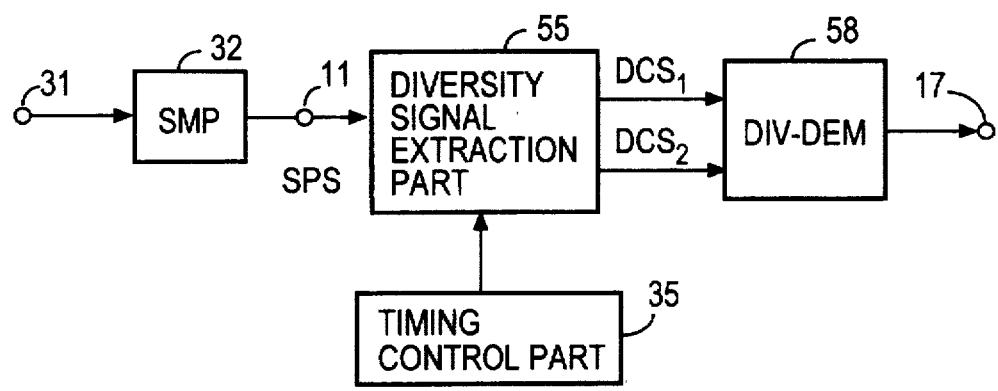
FIG. 15 is a block diagram illustrating the basic configuration of the present invention for the application to path diversity reception.

FIG. 15 illustrates an example of the path diversity configuration. In the path diversity scheme, the sampling circuit (SMP) 32 samples a single received signal generated from the received wave of a single antenna and outputs a single sampled signal SPS. The despreading/combining processing and the coefficient control processing in the diversity signal extraction part 55 are carried out at a plurality of different timings $t_1$ and $t_2$ of the sampled signal SPS, and a plurality of branch combined signals $DCS_1$ and $DCS_2$ are outputted. The timing signal for the processing is generated by the timing control part 35. The diversity demodulation part (DIV-DEM) 58 combines and demodulates the branch combined signals $DCS_1$ and $DCS_2$.

With this configuration, the paths can be isolated, and if their transmission path characteristics vary independently of each other, the diversity effect can be obtained due to combining and demodulating the branch combined signals.

Incidentally, the configuration of this embodiment can be combined with the antenna diversity configuration; they can be combined in several ways. One is to generate combined signals corresponding to multipath signals for each branch of the antenna diversity scheme and diversity-combine the combined signals of a number corresponding to the product of the numbers of antenna branches and propagation paths. The diversity demodulation part 58 of such a configuration as depicted in FIGS. 12A, 12B, or 12C is applied for the combining and demodulating operations. Second is to cancel delay interference due to multipath propagation by performing the path diversity processing for each antenna branch and re-combine the extracted signals. In this case, the extraction part utilizes the output of the adder 61 in FIG. 12B.

EMBODIMENT 8

Figure 16:
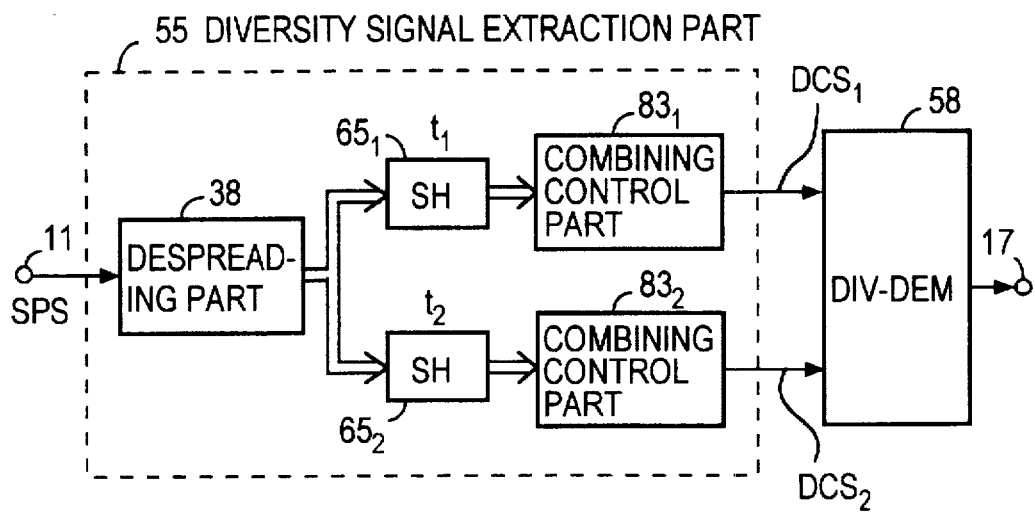
FIG. 16 is a block diagram illustrating an embodiment of the present invention applied to the path diversity reception.

In FIG. 16 there is shown an embodiment for generating the branch combined signal of the path diversity scheme by a despreading part. The diversity signal extraction part 55 is comprised of one despreading part 38, a plurality of sample-hold (SH) parts $65_1$ and $65_2$ and a plurality of combining control parts $83_1$ and $83_2$ each composed of the linearly combining part 39 and the coefficient control part 37 both shown in FIG. 6. As is the case with FIG. 6, the despreading part 38 despreads a single sampled signal SPS by a plurality of despreading codes and outputs a plurality of despread signals. These despread signals are fed to the sample-hold parts $65_1$ and $65_2$, wherein they are sampled at the timing $t_1$ and $t_2$, respectively. The thus sampled despread signals are fed to the combining control parts $83_1$ and $83_2$, which multiply them by respective weighting coefficients and combine them, then output the branch combined signals $DCS_1$ and $DCS_2$. In this case, the weighting coefficients are adaptively controlled so that the combined output under the coefficient-constraint becomes minimum. Incidentally, the propagation path is a two-path model as is the case with FIG. 14.

The sampled signal SPS via the input terminal 11 is despread by a plurality of despreading codes in the despreading part 38, from which a plurality of despread signals are provided. These despread signals are sampled and held by the sample-hold part $65_1$ with the timing $t_1$ and by the sample-hold part $65_2$ with the timing $t_2$, respectively. The combining control part $83_1$ combines the plurality of despread signals outputted by the sample-hold part $65_1$ and the combining control part $83_2$ combines the plurality of despread signals outputted by the sample-hold part $65_2$. The despreading part 38, the sample-hold parts $65_1$ and $65_2$ and combining control parts $83_1$ and $83_2$ correspond to the diversity signal extraction part as a whole. The diversity demodulation part 58 combines and demodulates the combined signals outputted by the combining control parts $83_1$ and $83_2$, and feeds a decision signal to the output terminal 17.

With this configuration, the signals via two different paths are regarded as independent signals; hence, the path diversity effect can be available. While this embodiment has been described in the case of the two-path model for the propagation path, the configuration can easily be extended to the path diversity scheme with three or more paths.

EMBODIMENT 9

Figure 17:
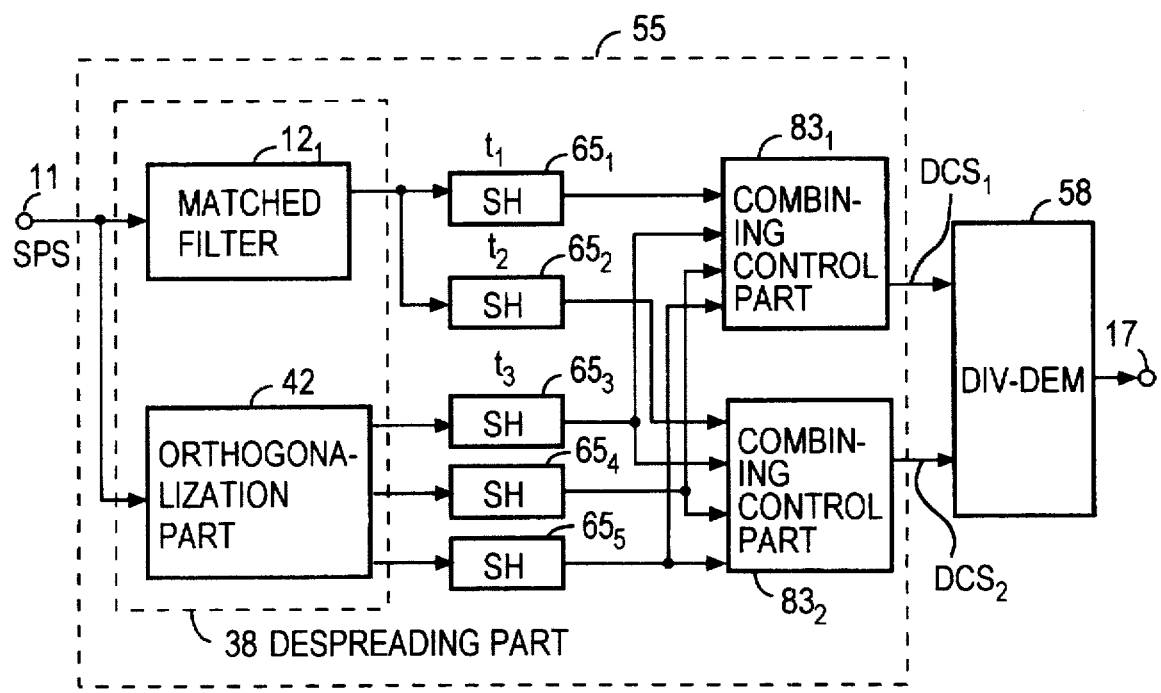
FIG. 17 is a block diagram illustrating another embodiment of the present invention applied to the path diversity reception.

FIG. 17 illustrates an embodiment in which branch combined signals of the path diversity scheme are generated by the despreading part 38 using an orthogonalization part. The propagation path is a two-path model. In the despreading part 38, as described previously with reference to FIG. 7, the spreading code of the desired signal is used in the matched filter $12_1$ and the plurality of spreading codes, which are orthogonal to the spreading code of the desired signal and orthogonal to one another, are used in the orthogonalization part 42. The timing $t_3$ for sampling the output of the orthogonalization part 42 is synchronous with the sample timing $t_1$ as in the embodiment of FIG. 16, but under special conditions they may be asynchronous ($t_3 \neq t_1$) as shown.

The sampled signal SPS via the input terminal 11 is fed to the despreading part 38. The despreading part 38 is identical with that depicted in FIG. 7, for instance; it comprises the matched filter $12_1$ which uses the spreading code of the desired signal and the orthogonalization part 42 which uses the plurality of spreading codes orthogonal to the above. The output signal of the matched filter $12_1$, that is, the despread signal produced by despreading the sampled signal with the spreading code of the desired signal, is inputted into the sample-hold parts $65_1$ and $65_2$. The sample-hold part $65_1$ samples the above-mentioned despread signal at the timing $t_1$ and holds it for the symbol duration T, and the sample-hold part $65_2$ similarly samples the despreading signal at the timing $t_2$ and holds it for the symbol duration T. Three output signals of the orthogonalization part 42, that is, three despread signals generated by despreading the sampled signal with three despreading codes orthogonal to the spreading code of the desired signal, are fed to three sample-hold parts $65_3$ to $65_5$, respectively. The sample-hold parts $65_3$ to $65_5$ sample the three despread signals at the timing $t_3$ which is not always synchronous with the timing $t_1$ and $t_2$ and hold them for the symbol duration T. The combining control part $83_1$ linearly combines the output signals of the sample-hold part $65_1$ and $65_3$ to $65_5$ and outputs the combined signal $DCS_1$. Similarly, the combining control part $83_2$ linearly combines the output signals of the sample-hold parts $65_2$ and $65_3$ to $65_5$ and outputs the combined signal $DCS_2$. The diversity demodulation part 58 combines and demodulates the combined signals of the combining control parts $83_1$ and $83_2$ and feeds a decision signal to the output terminal 17.

This configuration can gain the path diversity effect because the desired signal which passes over the two different paths corresponding to the sample timing $t_1$ and $t_2$ are regarded as independent signals. With respect to interference signal components, however, it is necessary to meet conditions that they undergo closely correlated changes at these two sample timings and that an interference signal component closely correlated to those at the timings $t_1$ and $t_2$ also be sampled at the timing $t_3$ different from those of $t_1$ and $t_2$. While this embodiment has been described with reference to the two-path model for the propagation path, the configuration of this embodiment can easily be extended to the path diversity scheme with three or more paths. By sampling and holding the plurality of despread signals of the orthogonalization part 42 with only one timing $t_3$ as described above, the number of sample-hold parts used can be reduced accordingly.

EMBODIMENT 10

Figure 18:
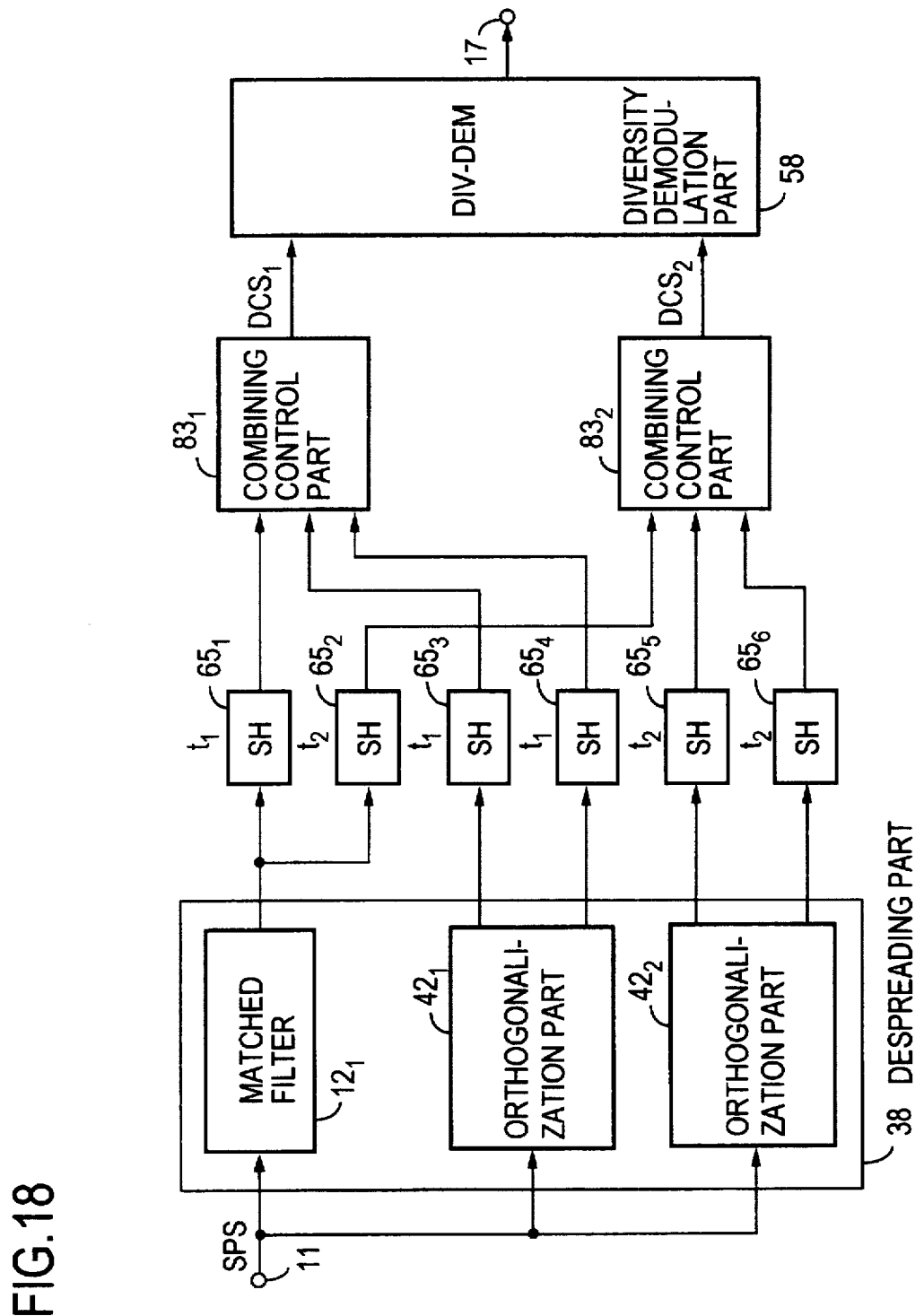
FIG. 18 is a block diagram illustrating another embodiment of the present invention applied to the path diversity reception.

FIG. 18 illustrates another embodiment which generates the branch combined signals of the path diversity scheme by the despreading part having the orthogonalization part.

The despreading part 38 is composed of the same matched filter $12_1$ as in FIG. 17 and orthogonalization parts of the same number as that of paths to be considered. In this example, the propagation path is a two-path model and two orthogonalization parts $42_1$ and $42_2$ are set. Let $t_1$ represent the timing of direct path of a desired signal that are received under the propagation over the two paths and $t_2$ the timing of delayed paths. Furthermore, let Cd denote the spreading code of the desired signal, Cd(+δ) denote a code that is obtained by shifting the chip of the spreading code Cd of the desired signal in the positive direction by the timing difference, $t_2-t_1=67$, between the two paths, and Cd(−δ) denote a code that is obtained by shifting the chip of the spreading code by δ in the negative direction. The matched filter $12_1$ uses the spreading code Cd of the desired signal, the orthogonalization part $42_1$ uses a plurality of despreading codes orthogonal to both the spreading code Cd of the desired signal and the shift code Cd(+δ), and the orthogonalization part $42_2$ uses a plurality of spreading codes orthogonal to both of the spreading code Cd and the shift code Cd(−δ). The orthogonalization part $42_1$ operates on the basis of the timing $t_1$ of the direct path. On the other hand, the orthogonalization part $42_2$ operates on the basis of the timing $t_2$ of the delayed path and its output signals are sampled in the sample-hold parts $65_5$ and $65_6$ with the timing $t_2$ of the delayed path. Incidentally, the number of output signals outputted by each of the orthogonalization parts $42_1$ and $42_2$ is two, smaller than the number of paths by one, unlike in the case of the orthogonalization part in FIG. 7.

The sampled signal is inputted into the despreading part via the input terminal 11. The sampled signal SPS is despread by the spreading code of the desired signal in the matched filter $12_1$ and the despread signal is fed to the sample-hold parts $65_1$ and $65_2$. The sample-hold part $65_1$ samples the despread signal with the timing $t_1$ and holds it for the symbol duration T; the sample-hold part $65_2$ samples the despread signal with the timing $t_2$ and holds it for the symbol duration T. The orthogonalization parts $42_1$ and $42_2$ each output a plurality of despread signals generated by despreading the sampled signal by using the codes orthogonal to both the spreading code of the desired signal and the codes obtained by shifting it in accordance with the timing difference between the propagation paths. These despread signals are fed to the sample-hold parts $65_3$, $65_4$ and $65_5$, $65_6$. The sample-hold parts $65_3$ and $65_4$ sample the plurality of despread signals of the orthogonalization part $42_1$ with the timing $t_1$ and hold them for the symbol duration T. On the other hand, the sample-hold parts $65_5$ and $65_6$ sample the plurality of despread signals of the orthogonalization part $42_2$ with the timing $t_2$ and hold them for the symbol duration T.

The combining control part $83_1$ combines the output signals of the sample-holds parts $65_1$, $65_3$ and $65_4$ and outputs the combined signal $DCS_1$. As the result of this, the spreading signal components of other users contained in the despread signals with the timing $t_1$ are removed therefrom. Similarly, the combining control part $83_2$ combines the output signals of the sample-hold parts $65_2$, $65_5$ and $65_6$ and outputs the combined signal $DCS_2$. As the result of this, the spreading signal components of other users contained in the despread signals obtained with the timing $t_2$ are removed therefrom. The diversity demodulation part 58 diversity-demodulates the combined signals $DCS_1$ and $DCS_2$ of the combining control parts $83_1$ and $83_2$, obtained with the timing $t_1$ and $t_2$, and outputs a decision signal to the output terminal 17, as is the case with FIGS. 15, 16 and 17.

With this configuration, it is possible to obtain the path diversity effect, because the signals that pass over two different paths are regarded as independent signals. While this embodiment has been described using the two-path model as the propagation path, the configuration of this embodiment can easily be extended to the path diversity scheme with three or more paths.

EMBODIMENT 11

Figure 19:
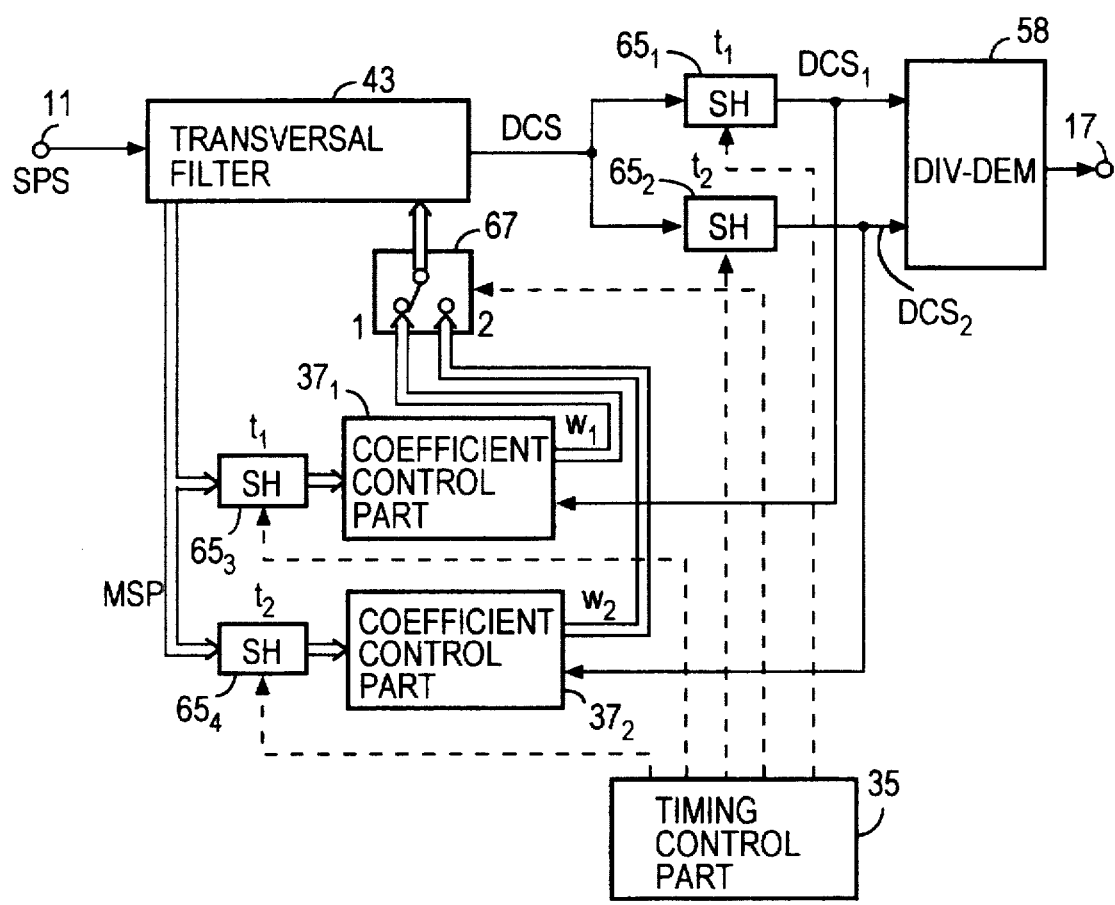
FIG. 19 is a block diagram illustrating an embodiment of a path diversity receiver which uses a transversal filter to despread and linearly combine sampled signals.

FIG. 19 illustrates an embodiment designed to generate the branch combined signal of the path diversity scheme by a despreading/combining part using a transversal filter. The propagation path is a two-path model. The result of convolution of the sampled signal SPS and the tap coefficients W of the transversal filter 43 is sampled with different timings $t_1$ and $t_2$ corresponding to the propagation paths and the sampled signals are outputted as the plurality of branch combined signals $DCS_1$ and $DCS_2$. Furthermore, a sequence of sampled signals SPS is outputted as the signals to be multiplied MPS. The coefficient control parts $37_1$ and $37_2$ use the signals MPS and the branch combined signals $DCS_1$ and $DCS_2$ to output the tap coefficients $W_1$ and $W_2$ corresponding to the timings $t_1$ and $t_2$, respectively.

The sampled signal SPS via the input terminal 11 is inputted into the transversal filter 43 identical in construction with that shown in FIG. 8, which performs the despreading and linearly combining operations and outputs the combined signal DCS. The combined signal DCS is fed to the sample-hold parts $65_1$ and $65_2$. The sample-hold part $65_1$ samples the combined signal with the timing $t_1$ and holds it for the symbol duration T, and the sample-hold part $65_2$ samples the combined signal with the timing $t_2$ and holds it for the symbol duration T. The sampled signal sequence MPS (see FIG. 8) set in the transversal filter 43 is fed to the sample-hold parts $65_3$ and $65_4$, wherein it is sampled with the timings $t_1$ and $t_2$ and held for the symbol duration T.

The coefficient control part $37_1$ is supplied with the combined signal $DCS_1$ outputted by the sample-hold part $65_1$ and the sampled signal sequence SPS outputted by the sample-hold part $65_3$ which is set in the transversal filter 43, whereas the coefficient control part $37_2$ is supplied with the composite signal $DCS_2$ outputted by the sample-hold part $65_2$ and the sampled signal sequence MPS outputted by the sample-hold part $65_4$ which is set in the transversal filter 43. These coefficient control parts calculate and output the tap coefficients $W_1$ and $W_2$ which minimize the average power of the combined signal under the constraints of the tap coefficients $W_1$ and $W_2$. A switching circuit 67 selectively sets the tap coefficients $W_1$ and $W_2$ outputted by the coefficient control part $37_1$ and $37_2$ in the transversal filter 43 so that the transversal filter 43 is allowed to output a desired combined signal. The timing control part 35 controls the operation timing of each of the sample-hold parts $65_1$ to $65_4$ and the switching circuit 67. The diversity demodulation part 58 combines and demodulates the combined signals $DCS_1$ and $DCS_2$ outputted by the sample-hold parts $65_1$ and $65_2$ and feeds a decision signal to the output terminal 17.

This configuration needs only one transversal filter 43. While this embodiment has been described in the case of the two-path model as the propagation path, the configuration of this embodiment can easily be extended to the scheme with three or more paths.

EMBODIMENT 12

Figure 20:
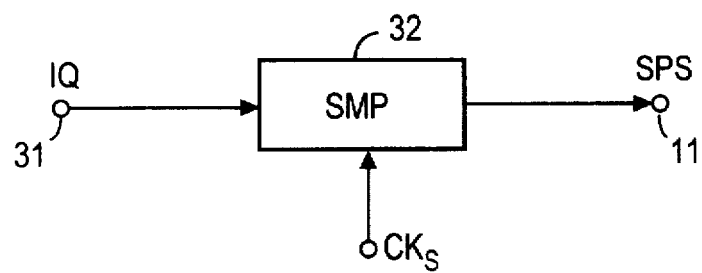
FIG. 20 is a block diagram showing an embodiment of a sampling circuit for use in the present invention.
Figure 21:
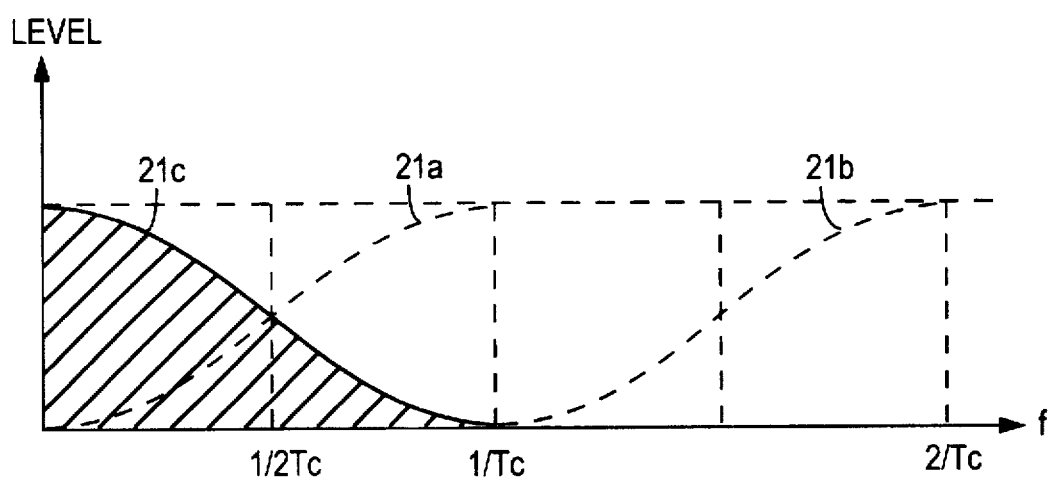
FIG. 21 is a graph for explaining the aliasing of the received signal spectrum by sampling.

A description will be given, with reference to FIGS. 20 and 21, of the case where the sampling period in the sampling circuit 32 of the receiver of the present invention depicted in FIG. 5 is made shorter than the chip period of the spreading code.

The detected signal IQ is input via the input terminal 31. Letting the chip period of the spreading code be represented by Tc, the detected signal IQ is sampled by a sampling clock CKs of a sampling period Tc/2 and is outputted as the sampled signal SPS to the output terminal 11. While in this case the sampling clock CKs of the sampling period Tc/2 is used, the sampling period in the sampling circuit 32 may also be set to a value above the period Tc/2 and below Tc in accordance with the band of the detected signal IQ.

A description will be given, with reference to FIG. 21, of the reason why the sampling period is set below Tc, that is, why the sampling frequency is set above 1/Tc. Assume that the band of the detected signal IQ is above ½Tc. The spectrum of the sampled detected signal IQ is an overlapping of its original spectrum 21c and a spectrum shifted therefrom by an integral multiple of the sampling frequency. When setting the sampling frequency to 1/Tc, the original spectrum 21c and a folded spectrum waveform 21a of a spectrum shifted from the original one by the sampling frequency 1/Tc overlap, with the result that the signal obtained by sampling has a distorted spectrum waveform different from the original spectrum. This distortion is called aliasing; this distortion makes it impossible to reconstruct the original detection signal from the sampled one, constituting an obstacle to digital signal processing. On the other hand, when the sampling frequency is set to 2/Tc, the folded spectrum waveform 21b of the spectrum shifted from the original one by the sampling frequency 2/Tc does not overlap the original spectrum; hence, no aliasing occurs. With such an increase in the sampling frequency, it is possible to prevent the generation of the aliasing.

By such sampling, the number of independent samples becomes twice the process gain, doubling the number of signals that can be removed. On the other hand, when other users are asynchronous, the number of independent modulated signals for one symbol of the desired signal becomes twice the number of other users; since this is not beyond the range of the number of signals that can be removed, interference signals of asynchronous other users can all be cancelled.

As described above, the matter of asynchronous timing can be dealt with by the sampling at the rate twice higher than the chip rate. From the viewpoint of signal processing, this sampling is equivalent to a doubling of the dimension Gp of processing; hence, in the case of using the despreading part 38 shown in FIG. 6 or such an orthogonalization part 42 as depicted in FIG. 7, 2 Gp despreading circuits need to be set to perform 2-Gp-dimensional orthogonalization, including the desired signal. In the case of performing the despreading and combining operations at one time by the transversal filter 43 as in the FIG. 8 example, the tap spacing of the filter must be reduced by half. In this case, the steering vector of Eq. (12) is replaced by one that is obtained by interpolating the spreading code.

Next, a description will be given of examples of the configuration of the transmitting side which are suited to fully exploit the effect of the spread spectrum receiver according to the present invention.

EMBODIMENT 1 OF TRANSMITTER

Figure 22:
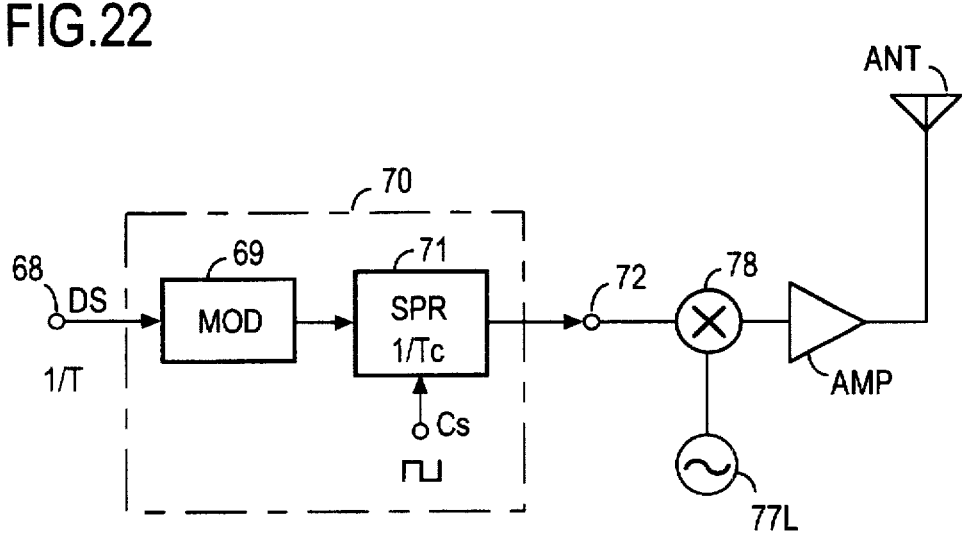
FIG. 22 is a block diagram illustrating the construction of a transmitter.

Referring to FIG. 22, a transmitter will be described which generates a transmission signal by a transmission processing part 70 formed by a cascade connection of a multilevel modulation part 69 and a spreading part 71. A binary digital signal DS is fed via an input terminal 68. Now, let the clock period of the digital signal be represented by T.

The modulation part 69 generates a multilevel modulated signal by using the digital signal DS. A spreading modulator which forms the spreading part 71 multiplies the modulated signal by a spreading code Cs of a chip period Tc and feeds the multiplied output to an output terminal 72. The spread-spectrum transmission signal is multiplied by a carrier signal outputted by an oscillator 77L in a multiplier 78, then amplified by an amplifier AMP and transmitted from an antenna ANT.

Figure 23A:
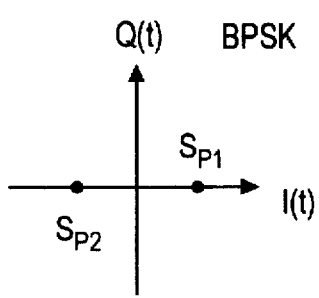
FIG. 23A is a graph showing signal points of a BPSK signal on an I-Q plane.
Figure 23B:
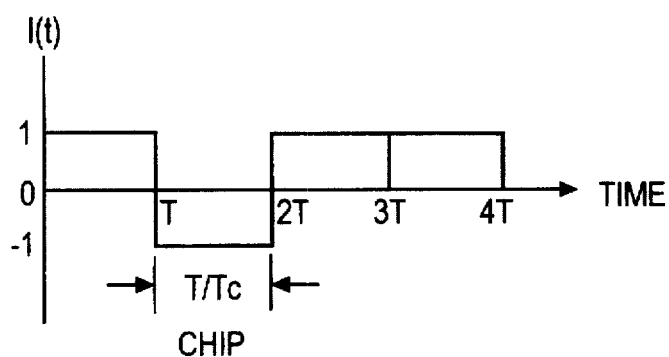
FIG. 23B is a graph showing an example of the BPSK signal.
Figure 23C:
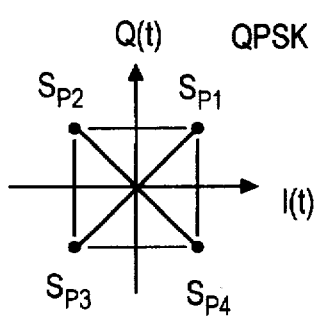
FIG. 23C is a graph showing signal points of a QPSK signal on the I-Q plane.
Figure 23D:
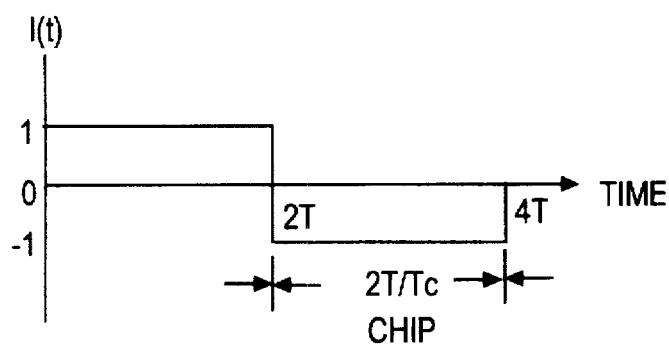
FIG. 23D is a graph showing an example of the QPSK signal.

FIG. 23A shows two signal points $Sp_1$ and $Sp_2$ in the case of generating BPSK modulation in the modulation part 69 in FIG. 22; the in-phase component I(t) of the modulated signal varies with the digital signal DS every period T as shown in FIG. 23B. Incidentally, the quadrature component Q(t) of the modulated signal remains zero. FIG. 23C shows four signal points $Sp_1$ to $Sp_4$ in the case of generating QPSK modulation in the modulation part 69; the in-phase component I(t) and the quadrature component Q(t) of the modulated signal vary with the digital signal DS every 2T as depicted in FIG. 23D.

Figure 24:
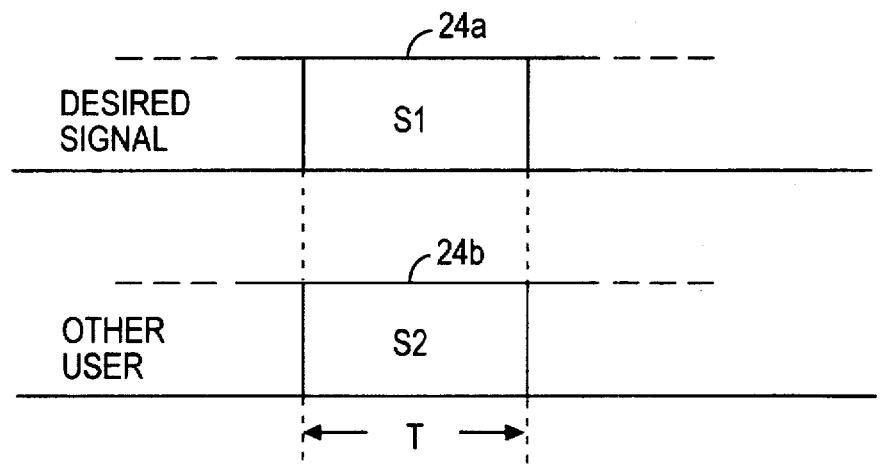
FIG. 24 is a diagram showing the timing of each signal when desired and interference signals are synchronous.
Figure 25:
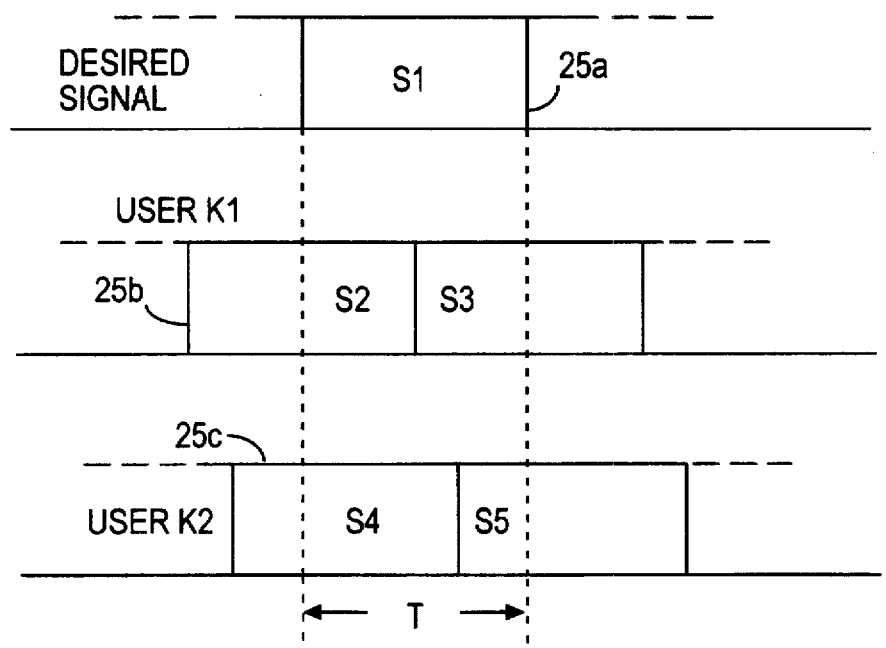
FIG. 25 is a diagram showing the timing of each signal when desired and interference signals are asynchronous.

The reason for using the multilevel modulated signal in the above is to increase the degree of freedom by the multilevel modulation and to thereby increase the degree of freedom in cancelling the interference signals. In the asynchronous system in which the desired signal receiving timing and the interference signal receiving timing are asynchronous, the number of interference signals to be cancelled is about twice that in the synchronous system in which the desired signal receiving timing and the interference signal receiving timing are synchronous with each other. This is shown in FIGS. 24 and 25. FIG. 24 shows the case of the synchronous system, in which the symbol timing of a modulated signal 24a of the desired signal and the symbol timing of a modulated signal 24b of another user coincide. FIG. 25 shows the case of the asynchronous system, in which in the duration of one symbol S1 of a modulated signal 25a of the desired signal the symbol of a modulated signal 25b of another user K1 changes from S2 to S3, with the result that the number of substantial interference signal components by said another user is two. This also applies to the case where the symbol of a modulated signal 25c by another user K2 changes from S4 to S5. These interference components could be cancelled by the double sampling in the embodiment described just above because the dimension of processing is doubled; but the increased degree of freedom by the multilevel modulation ensures more reliable interference cancelling.

Moreover, the multilevel modulation narrows the frequency band, and hence enables the process gain Gp to be increased. Accordingly, the multiplexity, i.e. the channel capacity can be increased. With the conventional orthogonalization scheme, since no sufficient orthogonality can be obtained, it is impossible to provide a margin of the ratio $E_r/N_o$ by multiplexing, and consequently, the multiplexity has to be further decreased. Since employing multilevel modulation increases the accuracy of orthogonalization, however, it is possible to ensure an increase in the multiplexity by narrowing the frequency band and ensure the operation in the asynchronous system.

EMBODIMENT 2 OF TRANSMITTER

Figure 26:
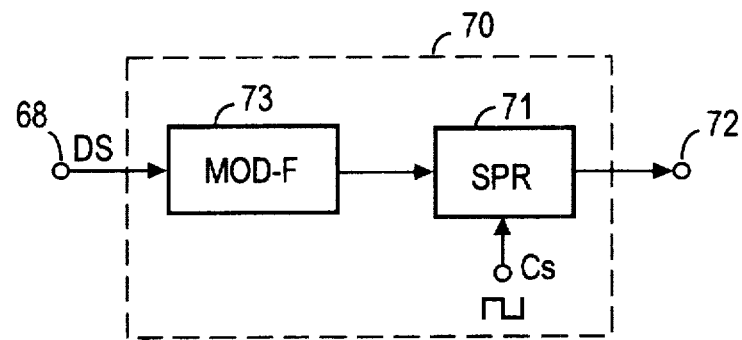
FIG. 26 is a block diagram illustrating the construction of a transmission processing part which performs a band limited modulation.
Figure 27:
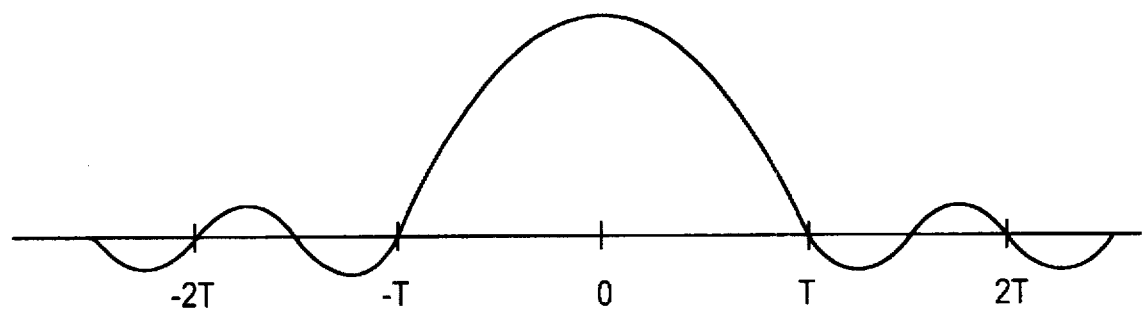
FIG. 27 is a diagram showing the impulse response of a signal subjected to the band limited modulation for transmission.
Figure 28:
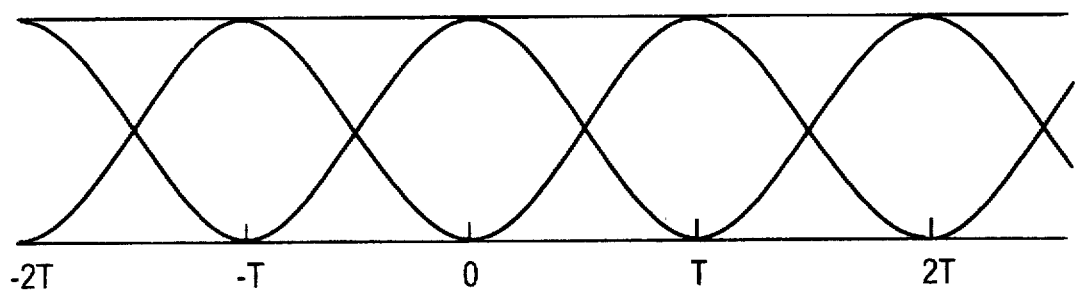
FIG. 28 is a diagram showing the eye pattern of the band-limited modulated signal.

Turning now to FIG. 26, a transmitter configuration will be described which generates a transmission signal by a transmission processing part 70 which is formed by a cascade connection of a modulation part (MOD-F) 73 including a band-limited filter and a spreading part (SPR) 71. A binary digital signal DS is fed via the input terminal 68. Now, let the clock period of the digital signal DS be represented by T. A modulator, which forms the modulation part 73, generates a band-limited signal by using the digital signal DS. The band-limited signal waveform of the modulated output is such as shown in FIG. 27. The main lobe spans over 2T. Hence, the eye pattern of the modulated signal is such as depicted in FIG. 28. A spreading modulator, which is the spreading part 71, multiplies the modulated signal by a spreading code Cs of the chip period Tc and feeds the multiplied output to the output terminal 72. This modulated signal is despread in the adaptive spread spectrum receiver into such a signal as shown in FIG. 27 which has a waveform spanning over substantially +2T. Thus, the despreading part which is composed of the matched filter, correlator, transversal filter, or the like, performs despread processing over a plurality of symbols as well as only one symbol when the band limiting techniques is employed. For example, the length of the transversal filter is so set as to cover several symbols. When the despread processing takes place over several symbols, a symbol at either side appears as intersymbol interference. Hence, the interference cancelling operation is carried out to cancel such intersymbol interference as well. In such an operation, as is the case with the multilevel modulation, the number of samples per symbol increases and hence, the number of signals that can be cancelled increases. Thus, the number of signals that can be cancelled can be increased unless the transmission performance is not extremely degraded by the intersymbol interference.

EMBODIMENT 3 OF TRANSMITTER

Figure 29A:
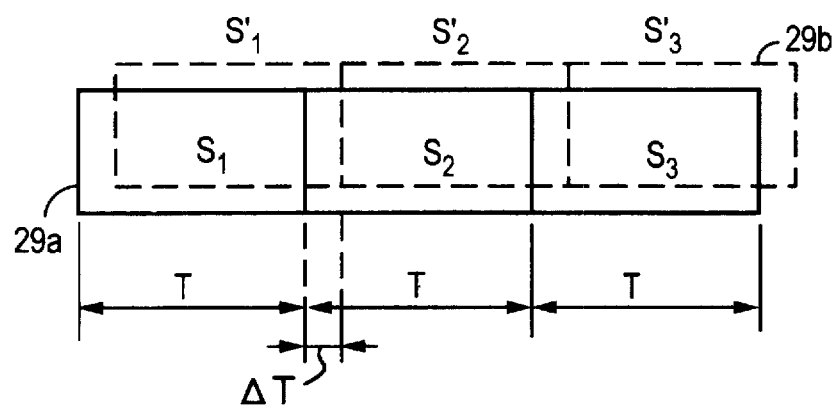
FIG. 29A is a diagram showing the timing relationship between modulated signals of direct and delayed paths to be received.
Figure 29B:
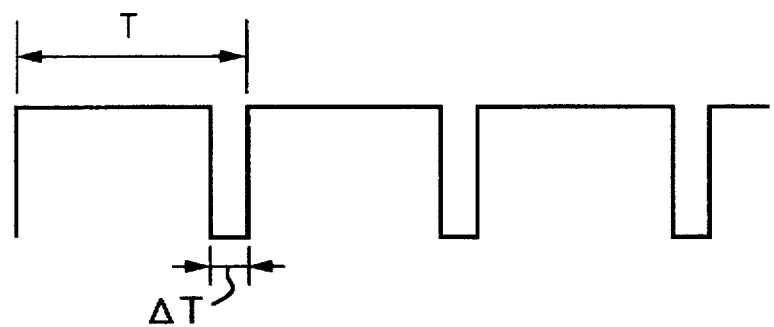
FIG. 29B is a timing diagram showing the relationship between a modulated signal generated by an RZ signal and a delay of multipath propagation.

Let it be assumed that the transmission signal is generated by applying an RZ signal to the transmission processing part 70 in FIG. 22. Assuming that the channel impulse response is that of a two-path model as depicted in FIG. 14, a direct (preceding) path 29a and a delayed path 29b are combined as shown in FIG. 29A, in which ΔT is $t_2-t_1$. When the modulated signal is generated with a symbol waveform by the RZ signal as shown in FIG. 29B, signal leak of other symbols, that is, the intersymbol interference can be suppressed during one symbol period T, and hence, degradation of the multipath propagation can be suppressed. In the actual application of this example, ΔT in FIG. 29B needs only to be set to a value nearly equal to a delay spread of the propagation path.

EMBODIMENT 4 OF TRANSMITTER

Figure 30:
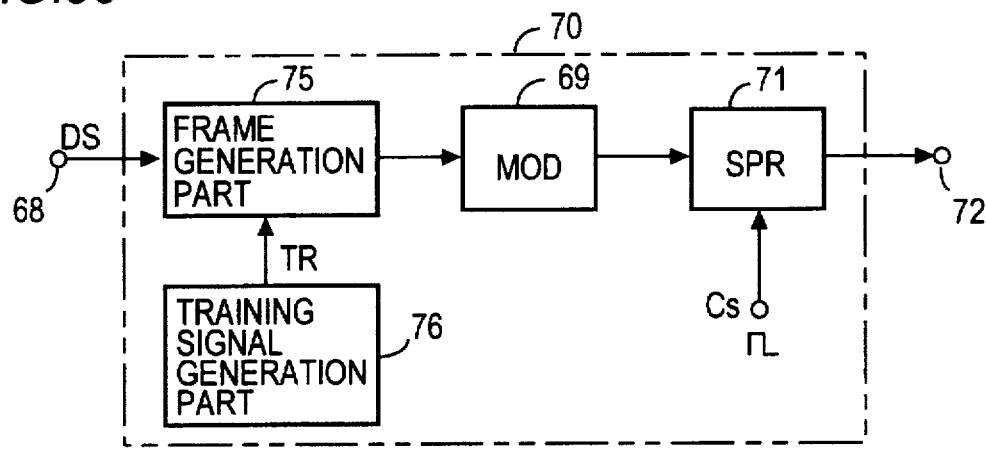
FIG. 30 is a block diagram illustrating the construction of a transmission processing part which generates a frame signal by combining a training and signal.
Figure 31:
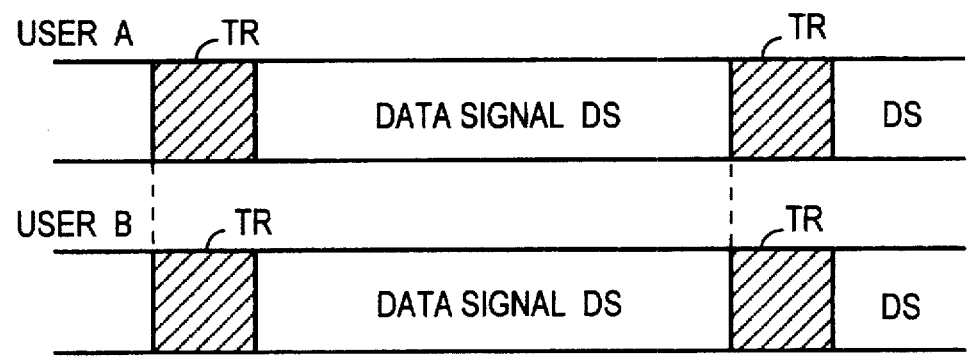
FIG. 31 is a diagram showing the transmission timing of a frame-structured signal.

In FIG. 30 there is illustrated a transmission processing part 70 designed so that training signals of the same length are inserted in respective frames of a frame-formatted transmission signal at the same position. In a frame generation part 75 a digital signal DS, which forms a data signal of the frame, is combined, every fixed length, with a training signal TR outputted by a training signal generation part 76 into a frame. The output outputted by the frame generation part 75 is modulated in the modulator (MOD) 69 and spectrum-spread by the spreading code Cs in the spreading part (SPR) 71, thereafter being fed as a transmission signal to the terminal 72. Now, consider a synchronous system in which the timing for transmission to every user is synchronized. This corresponds to a forward link in the digital mobile radio communication. At first, as shown in FIG. 31, the training signal TR is periodically inserted into the frames of respective users A and B. The training signal sequences TR of the respective users are assumed to have low correlation with each other. This scheme hastens the averaging of despread signals at the time of estimating the weighting coefficients W in the receiver, and hence shortens the time for estimating the weighting coefficient W. In other words, the time for starting up the adaptive spread spectrum receiver can be reduced.

EMBODIMENT 5 OF TRANSMITTER

Figure 32:
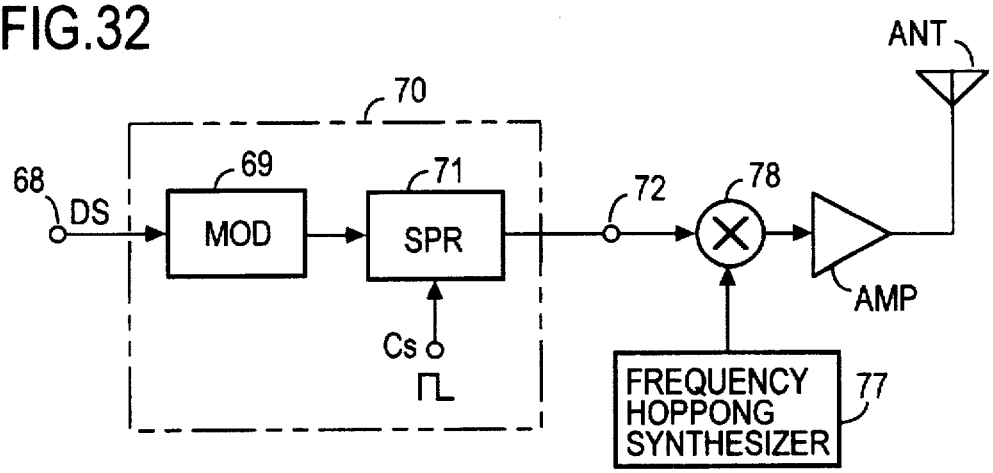
FIG. 32 is a block diagram illustrating the configuration of a transmitter which performs carrier frequency hopping.
Figure 33:
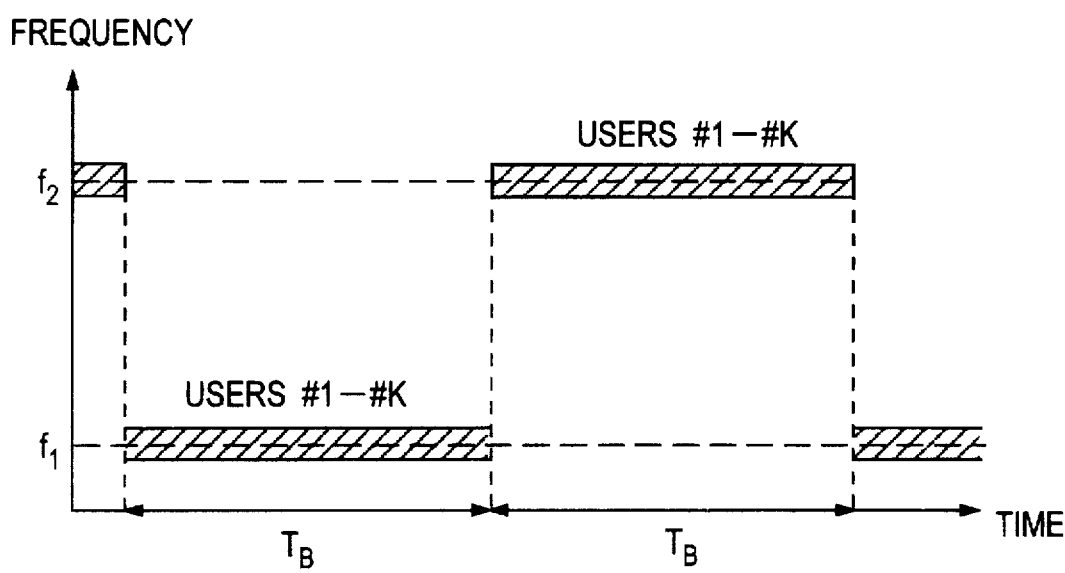
FIG. 33 is a timing chart for explaining the frequency hopping.
Figure 34:
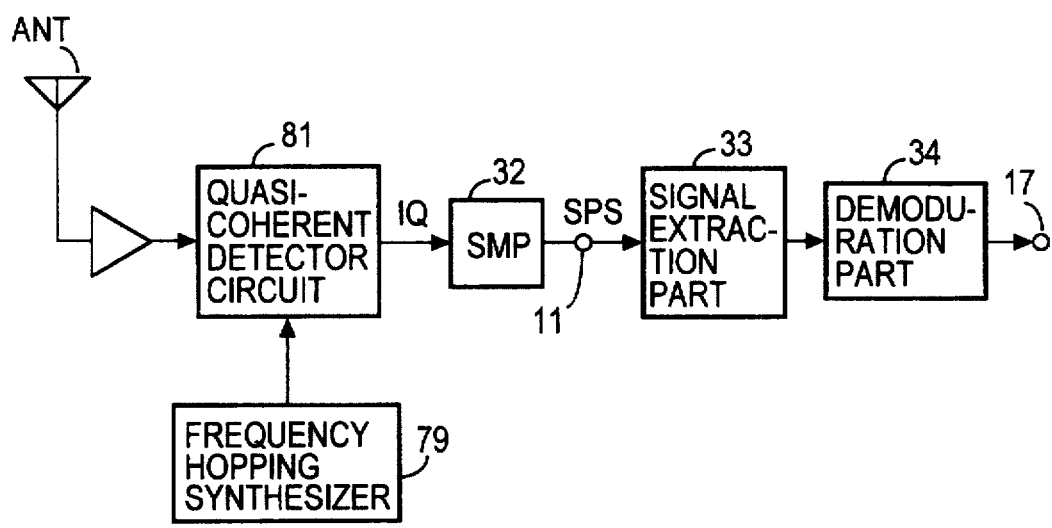
FIG. 34 is a block diagram illustrating the configuration of a receiver for a transmitted signal which performs frequency hopping as well.

In FIGS. 32 and 34 there are illustrated a transmitter and a receiver for use in the case where the adaptive spread spectrum scheme and the frequency hopping one are combined. As is the case with the FIG. 21 embodiment, the transmission processing part 70 of the transmitter modulates the digital signal DS in the modulator 69, spectrum-spreads the modulated signal by the spreading code Cs in the spreading modulation part 71 and feeds the signal to the terminal 72. In FIG. 32, the carrier frequency is caused to hop by a frequency hopping synthesizer 77 in synchronization with carrier signals of all the other users at regular time intervals, then the output outputted by the terminal 72 is multiplied by the frequency-hopped carrier in a multiplier 78 and the multiplied output is transmitted. By the frequency hopping, for example, as depicted in FIG. 33, the carrier frequencies for transmission to all the users #1 to #K are caused to hop between frequencies $f_1$ and $f_2$ at regular time intervals $T_B$, where $T_B$ is an integral multiple of the symbol duration T of the modulated signal.

In the receiver, as shown in FIG. 34, the received signal is fed to a quasi-coherent detector circuit 81, wherein it is subjected to a quadrature detection by using a hopping carrier frequency signal which is generated by a frequency hopping synthesizer 79 and hops as described above in respect of FIG. 33; the in-phase component I(t) and the quadrature component Q(t) of the detected signal are generated. The detected signal IQ is sampled by a sampler 32 and the sampled signal SPS is outputted. The signal extraction part 33, as described previously with respect to FIG. 5, subjects the sampled signal SPS to despreading and linearly combining operations and outputs the combined signal. The demodulation part 34 demodulates the combined signal and feeds a decision signal to the output terminal 17. The combined use of the adaptive spread spectrum scheme and the frequency hopping one produces the frequency diversity effect, and hence improves the transmission performance.

EMBODIMENT 6 OF TRANSMITTER

Figure 35:
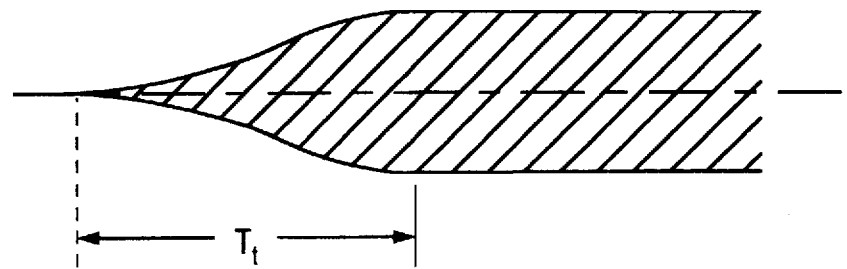
FIG. 35 is a diagram showing an example of carrier power control at the start of transmission.
Figure 36:
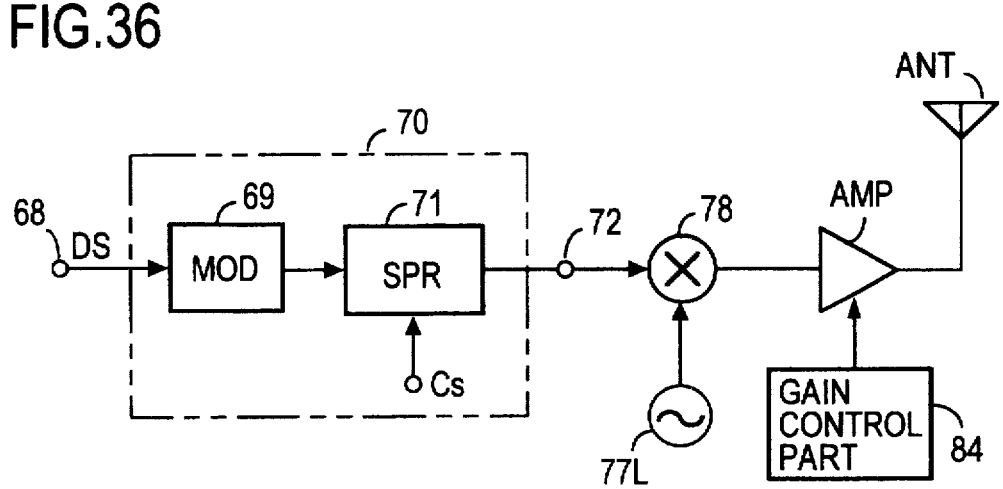
FIG. 36 is a block diagram illustrating the configuration of a transmitter which controls the carrier power.

Incidentally, the convergence of the adaptive algorithm of the adaptive spread spectrum receiver requires a transient response time that is defined by the time constant of the algorithm. Hence, if a user suddenly outputs transmitting power, the interference component cannot be cancelled during the transient response time Tt, resulting in the transmission performance being degraded. At the time of starting a new transmission, if the power is slowly increased taking the transient response time Tt into account as shown in FIG. 35, the influence on other users can be lessened. In FIG. 36 there is illustrated a transmitter designed to gradually increase the carrier level over about the same period of time as the time constant of the adaptive algorithm. The transmission signal outputted by the transmission processing part 70 of the same construction as shown in FIG. 22 is multiplied by the carrier outputted by the oscillator 77L in the multiplier 78 and its modulated carrier is fed to the amplifier AMP. A gain control part 84 controls the gain of the amplifier AMP so that the gain gradually increases after the start of transmission and remain at a predetermined value after the elapse of the time Tt as depicted in FIG. 35.

The transient response time may preferably be short; hence, it is desirable to use this scheme in combination with a scheme that, when an error is small, temporarily reduces the time constant of the adaptive algorithm to shorten the transient response time.

EMBODIMENT 7 OF TRANSMITTER

Figure 37:
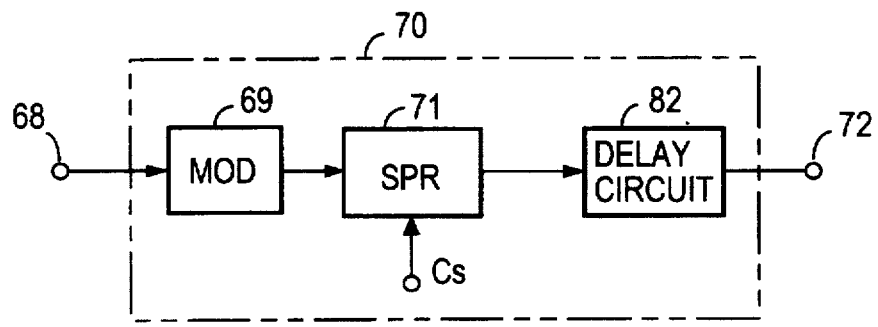
FIG. 37 is a block diagram illustrating the configuration of a transmission processing part which shifts the transmission timing.

For example, when the spreading takes place using a spreading code Cs of a pulse train waveform-shaped at a roll-off rate of 1.0, a waveform similar to that shown in FIG. 27 is obtained; letting the chip period be represented by Tc, the pulse waveform becomes zero at sample timing, $\pm(2m+1)Tc/2$, $m=1, 2, \ldots$, which is an odd multiple of Tc/2, except sample timing $\pm Tc/2$ (in the case of FIG. 27, the pulse waveform also becomes zero at sample timing which is an even multiple of $\pm Tc/2$). Hence, the cross-correlation between the same rolled-off spreading codes, after shifting them by an odd multiple of Tc/2 relative to each other, contains many multiplication-additions with zero points and the correlation value becomes small. For example, FIG. 37 shows the configuration of the transmission processing part 70 intended to decrease the correlation value through utilization of the above phenomenon. For half of the modulated signals spread by spreading codes of many users, which are transmitted from a base station, a delay circuit 82 is connected to the output of the spreading part 71 to shift the timing of the modulated and spread transmission signals to such timing as 3Tc/2 or -3Tc/2, by which the multiplication-addition with zeros increases in the cross-correlation between the signals, reducing the correlation value. The lower the cross-correlation, the higher the interference cancelling performance; hence, such a timing shift appreciably improves the transmission performance. As the number of users increases, the number of spreading codes required also increases. On the other hand, the number of spreading codes having mutually high orthogonality in the asynchronous state as well is limited, but by shifting the timing of respective transmission signals among different user groups to reduce the correlation between the spreading codes, it is possible to use the respective spreading code in common to users of different groups.

As described above, the present invention permits effective interference cancelling by orthogonalization and offers an adaptive spread spectrum receiver which does not require information about spreading codes and reception timing of other users, the training signal and the result of decision. Moreover, an excellent communication system can be implemented by employing the spread spectrum modulation scheme suited to the system using this receiver. Since the interference components can effectively be cancelled, the channel capacity of the communication system can be drastically increased.

The present invention is of great utility when employed in a radio system in which the same carrier frequency is shared by many users. Since in mobile radio communications calls of users change in time sequence, the invention is particularly effective in a receiver of the type that automatically extracts such information from received signals and adaptively cope with the change.

We claim:

1. An adaptive spread spectrum receiver comprising:

sample means which samples a received signal at regular time intervals and outputs sampled signals; and signal extraction means which despreads and linearly combines said sampled signals and outputs a combined signal;

wherein said signal extraction means comprises:

despreading/combining means which despreads and linearly combines said sampled signals by use of weighting coefficients to obtain said combined signal and outputs said combined signal and signals to be multiplied by said weighting coefficients; and coefficient control means which is supplied with said signal to be multiplied and said combined signal and calculates said weighting coefficients which minimize the average power of said combined signal under a constraint on said weighting coefficients.

2. The adaptive spread spectrum receiver of claim 1, wherein said despreading/combining means comprises:

despreading means which despreads said sampled signals by a plurality of despreading codes into a plurality of despread signals and outputs said plurality of despread signals as said signals to be multiplied; and linearly combining means which multiplies said plurality of despread signals by said weighting coefficients and combines the multiplied signals into said combined signal.

3. The adaptive spread spectrum receiver of claim 2, wherein said plurality of despreading codes of said despreading means is composed of a spreading code of a desired signal and one or more spreading codes orthogonal thereto.

4. The adaptive spread spectrum receiver of claim 1, wherein said despreading/combining part is means which convolutes a sequence of said sampled signals and a sequence of said weighting coefficients by a transversal filter and outputs the convoluted output as said combined signal and said sequence of sampled signals as said signals to be multiplied.

5. The adaptive spread spectrum receiver of claim 1, wherein said sample means is means which samples one or more received signals at regular time intervals and outputs one or more sampled signals;

wherein said signal extraction means is diversity signal extraction means which despreads and linearly combines said sampled signals by said despreading/combining means and said coefficient control means and outputs a plurality of branch combined signals; and which comprises diversity demodulation means which diversity-combines/demodulates said plurality of branch combined signals and outputs a decision signal.

6. The adaptive spread spectrum receiver of claim 5, wherein said sample means is means which outputs, as said sampled signals, received signals generated from received waves of a plurality of antennas; and wherein said diversity signal extraction means is means which comprises said despreading/combining means and said coefficient control means for each of said sampled signals and outputs combined signals outputted by said plurality of despreading/combining means as said plurality of branch combined signals.

7. The adaptive spread spectrum receiver of claim 5, wherein said sample means is means which outputs, as a single sampled signal, a received signal generated from a received wave of a single antenna; and wherein said diversity signal extraction means is means which performs processings of said despreading/combining means and said coefficient control means with different timings and outputs the results of such signal processings as said plurality of branch combined signals.

8. The adaptive spread spectrum receiver of claim 7, wherein said despreading/combining means comprises:

despreading means which despreads said sampled signal by a plurality of despreading codes to obtain a plurality of despread signals and outputs them as said signals to be multiplied; and a plurality of linearly combining means which sample said plurality of despread signals with different timings, multiply the sampled despread signals of different timings by weighting coefficients for the respective timings and combines the multiplied signals into said branch combined signals; and wherein said coefficient control means is a plurality of coefficient control means which uses, as said signals to be multiplied, said sampled despread signals sampled with said different timings and generate said weighting coefficients for said different timings.

9. The adaptive spread spectrum receiver of claim 8, wherein said plurality of despreading codes of said despreading means are a spreading code of a desired signal and one or more spreading codes orthogonal thereto; and wherein the timing for sampling said despread signals despread by said one or more spreading codes orthogonal to said spreading code of said desired signal is not synchronized with the timing of said despread signal despread by said spreading code of said desired signal in terms of sampling phase.

10. The adaptive spread spectrum receiver of claim 8, wherein said plurality of spreading codes of said despreading means are a spreading code of a desired signal and one or more spreading codes orthogonal to both of said spreading code of said desired signal and codes generated by shifting said spreading code of said desired signal in accordance with said timing, and the timing for sampling said despread signals despread by said one or more spreading codes orthogonal to both of said spreading code of said desired signal and codes generated by shifting said spreading code of said desired signal is synchronized with said despread signal despread by said spreading code of said desired signal in terms of sampling phase.

11. The adaptive spread spectrum receiver of claim 7, wherein said despreading/combining means is means which convolutes a sequence of said sampled signals and a sequence of said weighting coefficients by a transversal filter and outputs said plurality of branch combined signals and said sequence of sampled signals as said signals to be multiplied; and wherein said coefficient control means is means which outputs said weighting coefficients for said different timings on the basis of said signals to be multiplied and said plurality of branch combined signals.

12. The adaptive spread spectrum receiver of claim 1, wherein said sample means performs said sampling with a period shorter than a chip period of the code for said despreading.

13. The adaptive spread spectrum receiver of claim 2, 6, or 8, wherein said coefficient control means is means which calculates said weighting coefficients by using a correlation matrix of said plurality of despread signals, a steering vector using as its element the cross-correlation between said plurality of despreading codes and a despreading code of a desired signal, and a weighting coefficient constraint using said steering vector.

14. The adaptive spread spectrum of claim 13, wherein the period of said sampling is one half of a chip period and said despreading code of said desired signal has the number of elements doubled by interpolating its elements.

15. The adaptive spread spectrum receiver of claim 3, 9, or 10, wherein said coefficient control means is means which makes constant the weighting coefficient by which said despread signal of said desired signal is multiplied and calculates other weighting coefficients by use of a correlation matrix of said plurality of despread signals.

16. The adaptive spread spectrum receiver of claim 15, wherein the period of said sampling is one half of a chip period and said despreading code of said desired signal has the number of elements doubled by interpolating its elements.

17. The adaptive spread spectrum receiver of claim 4 or 11, wherein said coefficient control means is means which calculates said weighting coefficients by using a correlation matrix of said signals to be multiplied, a steering vector using each chip signal of a despreading code of a desired signal as its element and a weighting coefficient constraint using said steering vector.

18. The adaptive spread spectrum receiver of claim 17, wherein the period of said sampling is one half of a chip period and said steering vector has its number of elements doubled by interpolating elements of a steering vector in the case where the period of said sampling is the chip period.

19. The adaptive spread spectrum receiver of claim 1, wherein said coefficient control means is means which calculates said weighting coefficient by a recursive algorithm which satisfies a weighting coefficient constraint.

20. The adaptive spread spectrum receiver of claim 1, which receives, as said received signal, a transmitted signal generated by transmission processing means formed by a cascade connection of modulation means including a band limited filter and spreading means.

21. The adaptive spread spectrum receiver of claim 1, which receives, as said received signal, a transmitted signal generated by transmission processing means formed by a cascade connection of modulation means for a symbol waveform by an RZ signal and spreading means.

22. The adaptive spread spectrum receiver of claim 1, which receives, as said received signal, a transmitted signal generated by transmission processing means formed by a cascade connection of modulation means, spreading means and power control means which gradually increases the level of said transmitted signal over a period of time about the same as the time constant of said algorithm.

23. The adaptive spread spectrum receiver of claim 1, which receives, as said received signal, a transmitted signal generated by transmission processing means formed by a cascade connection of timing-shifted modulation means and spreading means.

24. The adaptive spread spectrum receiver of claim 1, which receives, as said received signal, a transmitted signal generated by transmission processing means formed by a cascade connection of frame generating means for generating a signal frame having periodically inserted thereinto training signals, modulation means and spreading means.

* * * * *